(12) United States Patent
Zhang

(10) Patent No.: US 11,404,753 B2
(45) Date of Patent: Aug. 2, 2022

(54) OVERCHARGE PROTECTION SYSTEMS HAVING DUAL SPIRAL DISK FEATURES FOR PRISMATIC LITHIUM ION BATTERY CELLS

(71) Applicant: CPS TECHNOLOGY HOLDINGS LLC, New York, NY (US)

(72) Inventor: Xugang Zhang, Milwaukee, WI (US)

(73) Assignee: CPS TECHNOLOGY HOLDINGS LLC, New York, NY (US)

(*) Notice: Subject to any disclaimer, the term of this patent is extended or adjusted under 35 U.S.C. 154(b) by 670 days.

(21) Appl. No.: 16/312,879

(22) PCT Filed: Aug. 1, 2017

(86) PCT No.: PCT/US2017/044957
§ 371 (c)(1),
(2) Date: Dec. 21, 2018

(87) PCT Pub. No.: WO2018/026850
PCT Pub. Date: Feb. 8, 2018

(65) Prior Publication Data
US 2019/0393704 A1    Dec. 26, 2019

Related U.S. Application Data

(60) Provisional application No. 62/369,718, filed on Aug. 1, 2016, provisional application No. 62/369,720, filed on Aug. 1, 2016.

(51) Int. Cl.
*H01M 10/0525* (2010.01)
*H02J 7/00* (2006.01)
(Continued)

(52) U.S. Cl.
CPC ..... *H01M 50/578* (2021.01); *H01M 10/0525* (2013.01); *H01M 10/0587* (2013.01);
(Continued)

(58) Field of Classification Search
CPC ........ H02J 7/00; H02J 7/0031; H02J 7/00302; H01M 2/02; H01M 2/12; H01M 2/34;
(Continued)

(56) References Cited

U.S. PATENT DOCUMENTS

| 5,304,431 A | 4/1994 | Schumm, Jr. |
| 5,691,073 A | 11/1997 | Vu et al. |

(Continued)

FOREIGN PATENT DOCUMENTS

| CN | 102005597 A | 4/2011 |
| CN | 102064333 A | 5/2011 |

(Continued)

OTHER PUBLICATIONS

International Search Report and Written Opinion for PCT/US2017/044957 dated Oct. 12, 2017, 12 pages.

*Primary Examiner* — Alexander Usyatinsky
(74) *Attorney, Agent, or Firm* — Christopher & Weisberg, P.A.

(57) ABSTRACT

A prismatic lithium ion battery cell includes a packaging having a cover. The cover includes: a first spiral disk feature disposed below a first terminal pad; a second spiral disk feature disposed below a second terminal pad; a first reversal disk disposed below the first spiral disk feature; and a second reversal disk disposed below the second spiral disk feature. The first and second reversal disks are configured to deflect upwards to displace the first and second spiral disk features to contact the first and second terminal pads, respectively, in response to a pressure within the packaging being greater than a predefined pressure threshold and form an external short-circuit between the first and second terminal pads via the first and second spiral disk features. Subsequently, a portion of the power assembly fails in response to the
(Continued)

external short-circuit and interrupts current flow between the first and second terminal pads.

14 Claims, 14 Drawing Sheets

(51) Int. Cl.
- H01M 50/578 (2021.01)
- H01M 10/0587 (2010.01)
- H01M 50/15 (2021.01)
- H01M 50/20 (2021.01)
- H01M 50/103 (2021.01)
- H01M 50/147 (2021.01)
- H01M 50/325 (2021.01)
- H01M 50/543 (2021.01)
- H01M 50/572 (2021.01)
- H01M 50/581 (2021.01)

(52) U.S. Cl.
CPC ....... H01M 50/103 (2021.01); H01M 50/147 (2021.01); H01M 50/15 (2021.01); H01M 50/20 (2021.01); H01M 50/325 (2021.01); H01M 50/543 (2021.01); H01M 50/572 (2021.01); H01M 50/581 (2021.01); H02J 7/0031 (2013.01); H01M 2200/103 (2013.01); H01M 2200/20 (2013.01); H01M 2220/10 (2013.01); H02J 7/00302 (2020.01); Y02T 10/70 (2013.01)

(58) Field of Classification Search
CPC ............ H01M 50/572; H01M 50/103; H01M 50/325; H01M 50/581; H01M 50/20; H01M 50/543; H01M 10/0525; H01M 50/15; H01M 10/0587; H01M 50/147; H01M 50/578; H01M 2200/103; H01M 2200/20; H01M 2220/10; Y02T 10/70; Y02E 60/10; Y02P 70/50
See application file for complete search history.

(56) References Cited

U.S. PATENT DOCUMENTS

| | | | |
|---|---|---|---|
| 5,707,756 A | 1/1998 | Inoue et al. | |
| 5,741,606 A | 4/1998 | Mayer et al. | |
| 5,766,791 A | 6/1998 | Takahashi et al. | |
| 5,879,832 A | 3/1999 | Vu et al. | |
| 5,985,479 A | 11/1999 | Boolish et al. | |
| 6,037,071 A | 3/2000 | Poirier et al. | |
| 6,210,824 B1 | 4/2001 | Sullivan et al. | |
| 6,451,473 B1 | 9/2002 | Saito et al. | |
| 6,900,616 B2 | 5/2005 | Burrus, IV et al. | |
| 7,433,794 B1 | 10/2008 | Berdichevsky et al. | |
| 7,470,482 B2 | 12/2008 | Takamura et al. | |
| 7,601,455 B2 | 10/2009 | Yoon | |
| 7,642,008 B2 | 1/2010 | Kim et al. | |
| 7,749,642 B2 | 7/2010 | Chang et al. | |
| 7,763,375 B2 | 7/2010 | Igoris et al. | |
| 7,879,484 B2 | 2/2011 | Hyung et al. | |
| 8,216,707 B2 | 7/2012 | Byun et al. | |
| 8,409,736 B2 | 4/2013 | Wang et al. | |
| 8,435,660 B2 | 5/2013 | Kim et al. | |
| 8,512,895 B2 | 8/2013 | Byun et al. | |
| 8,623,548 B2 | 1/2014 | Kim et al. | |
| 8,632,911 B2 | 1/2014 | Byun et al. | |
| 8,940,422 B2 | 1/2015 | Ito et al. | |
| 8,951,663 B2 | 2/2015 | Kim et al. | |
| 8,968,898 B2 | 3/2015 | Lee et al. | |
| 8,993,149 B2 | 3/2015 | Vu | |
| 9,012,050 B2 | 4/2015 | Byun et al. | |
| 9,099,732 B2 | 8/2015 | Kim et al. | |
| 9,190,636 B2 | 11/2015 | Kim et al. | |
| 9,252,400 B2 | 2/2016 | LePort et al. | |
| 9,257,686 B2 | 2/2016 | Kim et al. | |
| 9,324,990 B2 | 4/2016 | Han | |
| 9,425,453 B2 | 8/2016 | Han et al. | |
| 2006/0275657 A1* | 12/2006 | Kozuki | H01M 50/171 429/185 |
| 2007/0072072 A1* | 3/2007 | Maeda | H01M 50/463 429/164 |
| 2008/0220316 A1 | 9/2008 | Berkowitz et al. | |
| 2008/0254343 A1 | 10/2008 | Kaplin et al. | |
| 2010/0178539 A1 | 7/2010 | Elia et al. | |
| 2010/0227217 A1 | 9/2010 | Fujikawa et al. | |
| 2010/0291422 A1 | 11/2010 | Deng et al. | |
| 2011/0052949 A1 | 3/2011 | Byun et al. | |
| 2011/0070467 A1* | 3/2011 | Meintschel | H01M 10/4207 429/7 |
| 2011/0217572 A1 | 9/2011 | Yebka et al. | |
| 2012/0258339 A1* | 10/2012 | Kim | H01M 50/191 429/61 |
| 2013/0266830 A1 | 10/2013 | Byun et al. | |
| 2013/0337297 A1 | 12/2013 | Lee et al. | |
| 2014/0205897 A1 | 7/2014 | Byun et al. | |
| 2014/0212741 A1 | 7/2014 | Kim | |
| 2014/0212743 A1 | 7/2014 | Kim | |
| 2014/0349152 A1 | 11/2014 | Guen | |
| 2014/0377601 A1 | 12/2014 | Kim | |
| 2014/0377603 A1 | 12/2014 | Eberle et al. | |
| 2015/0079432 A1 | 3/2015 | Okuda et al. | |
| 2015/0147600 A1 | 5/2015 | Tsuruta et al. | |
| 2015/0171411 A1 | 6/2015 | Kobayashi et al. | |
| 2015/0188198 A1 | 7/2015 | Bonhomme et al. | |
| 2015/0207132 A1 | 7/2015 | Minagata et al. | |
| 2015/0221927 A1 | 8/2015 | Lee | |
| 2015/0243960 A1 | 8/2015 | Imanishi et al. | |
| 2015/0270528 A1* | 9/2015 | Guen | H01M 50/578 429/61 |
| 2015/0295211 A1 | 10/2015 | Kim et al. | |
| 2015/0325833 A1 | 11/2015 | Harayama et al. | |
| 2016/0043356 A1 | 2/2016 | Sunada et al. | |
| 2016/0329550 A1* | 11/2016 | Kohlberger | H01M 50/578 |

FOREIGN PATENT DOCUMENTS

| | | |
|---|---|---|
| CN | 203150628 U | 8/2013 |
| CN | 105531848 A | 4/2016 |
| CN | 105531849 A | 4/2016 |
| CN | 105765766 A | 7/2016 |
| DE | 102012200868 A1 | 7/2013 |
| DE | 102014200202 A1 | 7/2015 |
| EP | 0959508 A1 | 11/1999 |
| EP | 1076350 A2 | 2/2001 |
| EP | 2846380 A1 | 3/2015 |

* cited by examiner

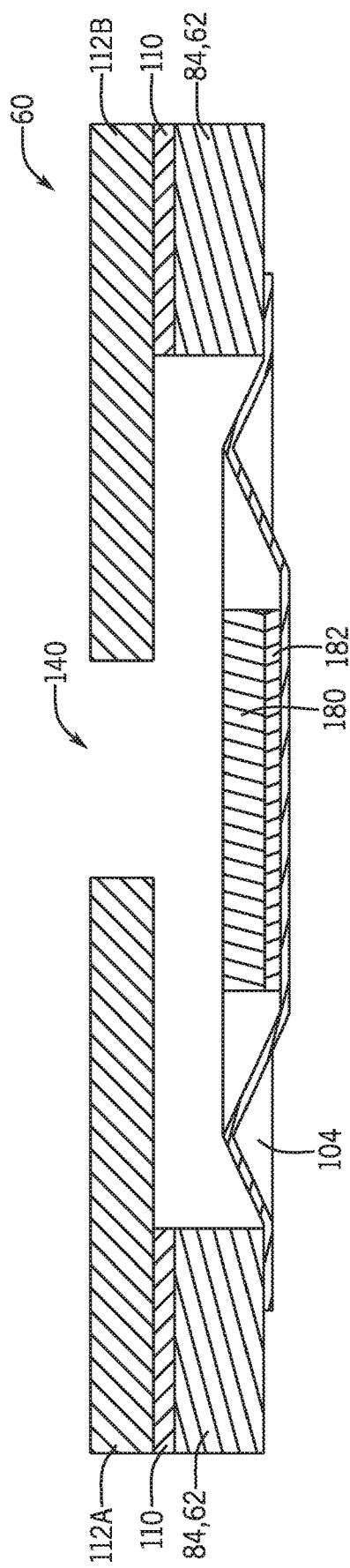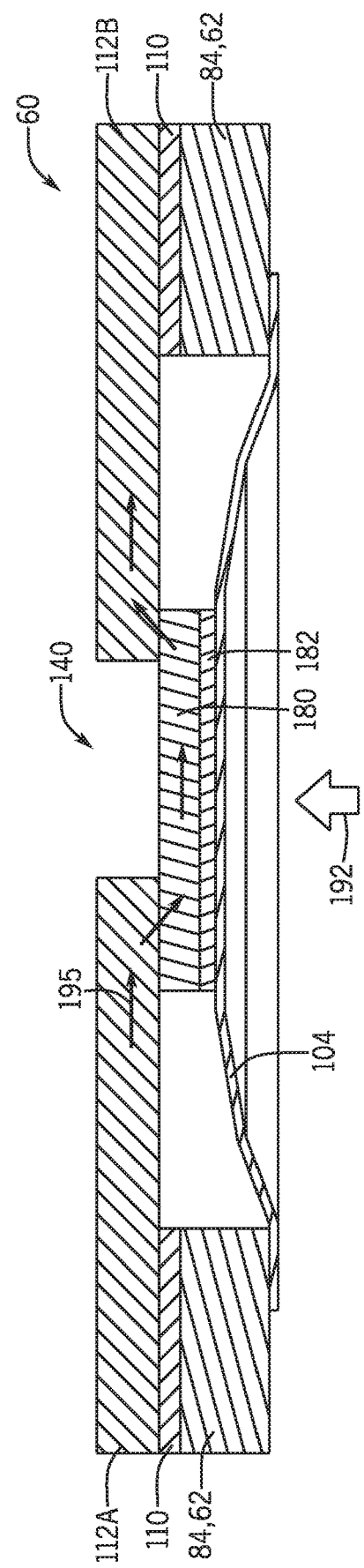

OVERCHARGE PROTECTION SYSTEMS HAVING DUAL SPIRAL DISK FEATURES FOR PRISMATIC LITHIUM ION BATTERY CELLS

CROSS REFERENCE TO RELATED APPLICATIONS

This application is a U.S. National Stage Application under 35 U.S.C. § 371 of International Application No. PCT/US2017/044957 entitled "OVERCHARGE PROTECTION SYSTEMS HAVING DUAL SPIRAL DISK FEATURES FOR PRISMATIC LITHIUM ION BATTERY CELLS," filed on Aug. 1, 2017, which claims priority to and the benefit of U.S. Provisional Application Ser. No. 62/369,718, entitled "OVERCHARGE PROTECTION DEVICES FOR PRISMATIC CELLS," filed Aug. 1, 2016, and claims priority from and the benefit of U.S. Provisional Application Ser. No. 62/369,720, entitled "OVERCHARGE PROTECTION DEVICES FOR CELLS WITH NEUTRAL CANS," filed Aug. 1, 2016, which are hereby incorporated by reference in their entireties for all purposes.

BACKGROUND

The present disclosure relates generally to the field of batteries and battery modules. More specifically, the present disclosure relates to overcharge protection systems for prismatic lithium ion battery cells.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Battery systems can provide viable alternatives or supplements to systems that operate based on fossil fuel combustion. Certain automotive vehicles (e.g., full electric vehicles, hybrid electric vehicles, micro-hybrid electric vehicles, or other types of "xEVs") incorporate battery systems to provide all or a portion of their vehicular motive force. Homes, offices, buildings, and similar locations, for instance, often include backup power sources, such as gas-powered electrical generators, that may be used in the event of a central power failure (e.g., due to inclement weather). Similarly, certain settings, such as temporary offices, temporary housing, or other settings located remotely from a power grid, may not necessarily be tied to an electrical grid and may instead rely on energy supplied by a relatively portable source, such as an engine-driven electrical generator. Stationary battery systems can be an attractive alternative for such settings, not only because they can be discharged with relatively low emissions compared to combustion processes, but also because other sources of energy, such as wind and solar, may be coupled to such stationary battery systems to enable energy capture for later use.

A lithium ion battery module generally includes a number of lithium ion battery cells that are electrically connected together in a suitable manner to store and provide charge, for example, within a stationary or automotive battery system. When a battery module is receiving power, the battery cells of the module are charged for later use. However, during this process, a battery cell can become overcharged, leading to unstable conditions in and around the battery cell, potentially including thermal runaway, rupture, ignition, and/or explosion of the battery cell. As such, it is desirable to reduce the risk of overcharging lithium ion battery cells in order to reduce the risk of damage to the battery module or the stationary/automotive power system resulting from these unstable battery cell conditions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a prismatic lithium ion battery cell includes a packaging having a cover sealed to a can. A power assembly is disposed within the packaging, and a first terminal pad and a second terminal pad are respectively disposed above the cover and electrically coupled to the power assembly. The cover includes: a first spiral disk feature disposed below the first terminal pad; a second spiral disk feature disposed below the second terminal pad; a first reversal disk disposed below the first spiral disk feature; and a second reversal disk disposed below the second spiral disk feature. The first and second reversal disks are configured to deflect upwards to displace the first and second spiral disk features to contact the first and second terminal pads, respectively, in response to a pressure within the packaging being greater than a predefined pressure threshold and form an external short-circuit between the first and second terminal pads via the first and second spiral disk features. Subsequently, a portion of the power assembly fails in response to the external short-circuit and interrupts current flow between the first and second terminal pads.

In another embodiment, a prismatic lithium ion battery cell, includes a packaging having a cover sealed to a can. A power assembly is disposed within the packaging and includes: a coil stack with at least one coil; a first current collector coupled to a first electrode of the at least one coil; a second current collector coupled to a second electrode of the at least one coil; a first terminal post coupled to the first current collector that extends through the cover; and a second terminal post coupled to a second current collector that extends through the cover, wherein the second terminal post is electrically connected to the cover. The cell also includes a first terminal pad coupled to the first terminal post and a second terminal pad coupled to the second terminal post. The cover includes: a first spiral disk feature disposed below the first terminal pad; a second spiral disk feature disposed below the second terminal pad; a first reversal disk disposed below the first spiral disk feature; and a second reversal disk disposed below the second spiral disk feature. The first and second reversal disks are configured to deflect upwards to displace the first and second spiral disk features to contact the first and second terminal pads, respectively, in response to a pressure within the packaging being greater than a predefined pressure threshold and form an external short-circuit between the first and second terminal pads via the first and second spiral disk features. Subsequently, a portion of the power assembly fails in response to the external short-circuit and interrupts current flow between the first and second terminal pads.

In another embodiment, a prismatic lithium ion battery cell includes a packaging that having a cover sealed to a can. A power assembly is disposed within the packaging and includes a positive side and a negative side. A first terminal pad is disposed above the cover of the packaging and electrically coupled to the negative side of the power assembly, and a second terminal pad disposed above the cover of the packaging and electrically coupled to the positive side of the power assembly. The cover includes: a first spiral disk feature disposed below the first terminal pad; a second spiral disk feature disposed below the second terminal pad; a first reversal disk sealed to the cover below the first spiral disk feature; and a second reversal disk sealed to the cover below the second spiral disk feature. In response to a pressure within the packaging being greater than a first predefined pressure threshold, the first and second reversal disks are configured to deflect upwards to displace the first and second spiral disk features to contact the first and second terminal pads, respectively, and form an external short-circuit between the positive and negative sides of the power assembly via the first and second spiral disk features. The cover also includes a vent disk sealed to the cover and configured to activate to release effluent from an interior of the packaging at a second predefined pressure threshold, wherein the first predefined pressure threshold is substantially less than the second predefined pressure threshold.

DRAWINGS

Various aspects of this disclosure may be better understood upon reading the following detailed description and upon reference to the drawings in which:

FIG. 12A is a cross-sectional view of another embodiment of an assembled CDD of an overcharge protection system of a prismatic lithium ion battery cell before activation, in accordance with embodiments of the present technique;

FIG. 12B is a cross-sectional view of the CDD of FIG. 12A after activation, in accordance with embodiments of the present technique;

DETAILED DESCRIPTION

Figure 1:
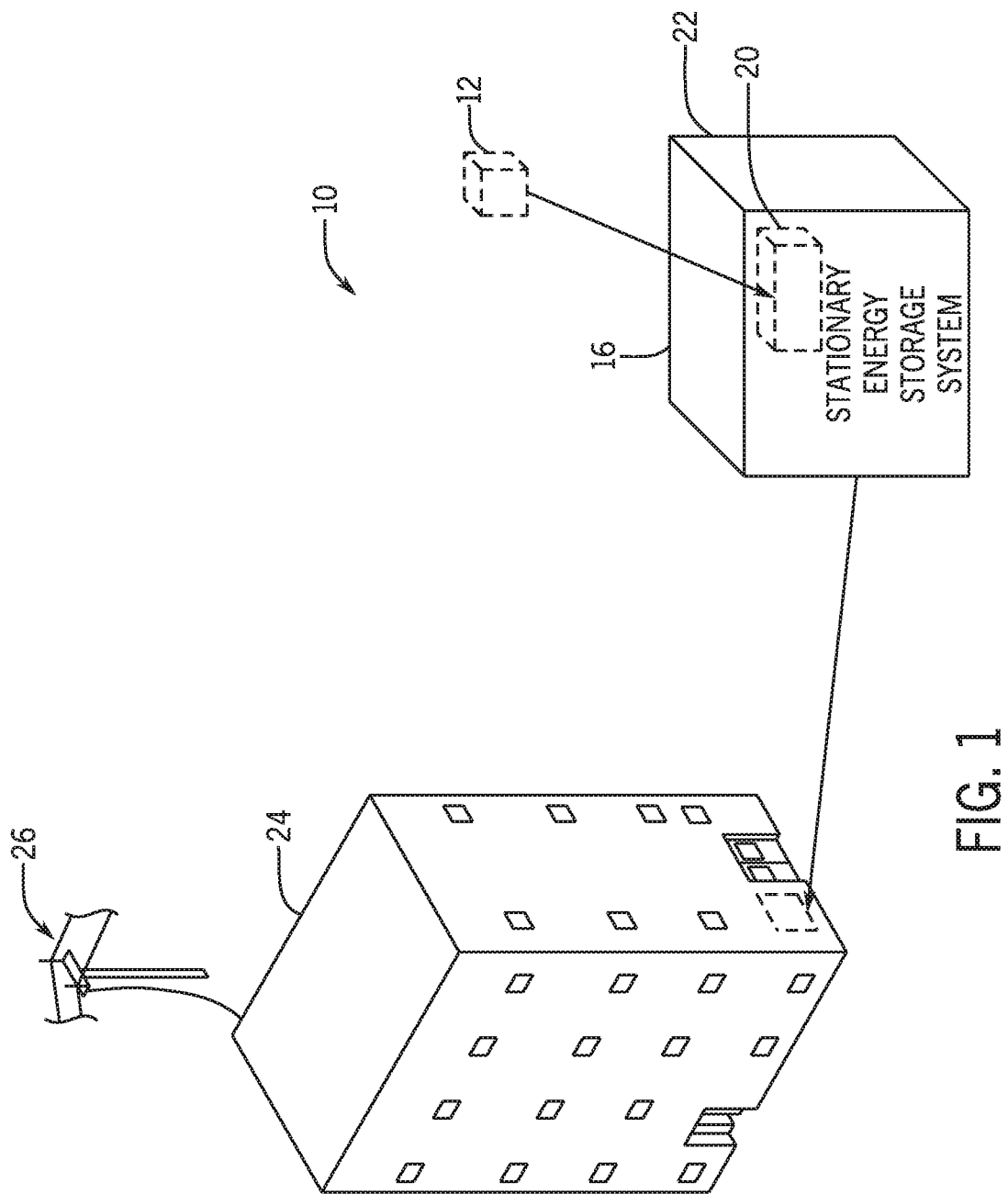
FIG. 1 is a schematic view of a stationary energy storage system that includes a stationary drawer housing and a battery module, in accordance with embodiments of the present approach.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As set forth above, when a lithium ion battery cell becomes overcharged, the resulting unstable conditions in and around the battery cell (e.g., thermal runaway, cell rupture, cell ignition, and/or cell explosion) may result in substantial damage to surrounding systems. When the battery cell is part of a larger battery module, or an even larger stationary energy storage system, the resulting damage may include damage to the battery cell, the battery module, as well as other portions of the stationary energy storage system. Additionally, larger battery cells (e.g., 100 amp hour (Ah) or greater) offer increased capacity to stationary energy storage systems. However, these larger battery cells can potentially release a greater amount of energy as a result of an overcharge event, increasing the risk of substantial damage to the battery module and/or the stationary energy storage system that includes the cell. With this in mind, present embodiments are directed toward overcharge protection systems for prismatic lithium-ion battery cells that are designed to suitably interrupt current within the battery cell to interrupt and limit or mitigate damage from an overcharge event. While the present technique is primarily discussed in relation to stationary energy storage systems, it should be appreciated that the disclosed approach is also applicable to automotive (e.g., vehicular) energy storage systems, as well as other suitable types of energy storage systems.

More specifically, in response to an overcharge event, the disclosed embodiments of the overcharge protection system are designed and arranged to first externally short-circuit the battery cell. The resulting current from the short-circuit is sufficiently high to damage (e.g., melt) one or more internal components of the battery cell. This damage electrically disconnects at least one of the terminals (e.g., the positive terminal, the negative terminal, or both) from the corresponding electrode (e.g., cathode or anode) in the interior of the battery cell, interrupting internal current flow between the terminals of the battery cell. Accordingly, by interrupting this current flow in response to an overcharge event, embodiments of the disclosed overcharge protection system prevent a battery cell from proceeding to thermal runaway, limiting damage within a battery module and/or an energy storage system (e.g., a stationary energy storage system or vehicular energy storage system) that includes the battery cell.

As discussed below, the presently disclosed overcharge protection systems include at least one current diverge device (CDD) that externally short-circuits a prismatic lithium ion battery cell in response to an increase in pressure within the cell's interior. When a battery cell is overcharged, a portion of the electrolytes within the battery cell may thermally expand, volatize, and/or decompose, generally increasing pressure in the interior of the battery cell. Other potential sources of gassing during overcharging include decomposition of the active materials and reactions between the active materials and the electrolyte and/or electrolyte additives. With this in mind, certain lithium ion battery cells include a vent feature that eventually opens to relieve this pressure, once the pressure surpasses a particular threshold, typically around approximately 6 bar or more. In contrast, in certain embodiments, the presently disclosed overcharge protection system includes a low-pressure current diverge device designed and arranged to interrupt current in battery cells in response to substantially lower pressures (e.g., around approximately 3-4 bar) within the interior of the battery cell. As such, certain embodiments of the present approach are able to respond more quickly (e.g., at a relatively low pressure, at a relatively lower state of charge (SOC) of the battery cell) to interrupt current in the battery cell in response to an overcharge condition before other protection features (e.g., a vent feature), reducing the aforementioned risks of damage to the battery module and/or the stationary energy storage system. Additionally, despite being able to interrupt current in a battery cell in response to a low activation pressure, the disclosed CDDs are designed and arranged to carry a sufficient amount of current during short-circuiting to ensure that the flow of current is permanently interrupted between the terminals of the battery cell in response to an overcharging event, as discussed below.

The presently disclosed CDD designs include three embodiments, which are discussed in detail below. In all of these CDD designs, a cover of the battery cell includes at least one reversal disk that deforms when a pressure within a packaging of battery cell reaches a predefined threshold. The deformation of the at least one reversal disk displaces at least one conductive element (e.g., a spiral disk feature, a conductive member) to contact at least one terminal pad of the battery cell, forming a short-circuit between the terminals that eventually leads to an interruption in current flow within the cell. More specifically, the disclosed embodiments include a battery cell having a single reversal disk and an unbiased or non-conductive packaging (as generally illustrated and discussed with regard to FIGS. 4, 5, 12, 13, and 14), in which a single conductive element contacts both terminal pads to form the short-circuit. The disclosed embodiments also include a battery cell having a single reversal disk and a biased packaging (generally illustrated and discussed with regard to FIGS. 9 and 10), in which a single conductive element contacts a single terminal pad to form the short-circuit via the cover of the battery cell. Additionally, the disclosed embodiments include a battery cell having dual reversal disks and an unbiased packaging (generally illustrated and discussed with regard to FIGS. 9 and 11), in which two conductive elements contact different respective terminal pads to form the short-circuit via the cover of the battery cell. Those skilled in the art will appreciate that various aspects of these disclosed embodiments can be combined or interchanged to provide CDD-protected battery cells having suitable packaging (e.g., materials, bias) for different battery module designs, in accordance with the present disclosure.

With the foregoing in mind, FIG. 1 is a schematic view of an embodiment of a battery system 10 in which a battery module 12 (e.g., lithium ion battery module 12) is configured to be used in a stationary energy storage system 16. More specifically, the battery module 12 may be used as all or a part of a stationary energy storage drawer 20. The stationary energy storage drawer 20 may be removably coupled to a stationary drawer housing 22 of the stationary energy storage system 16. Each stationary energy storage drawer 20 may include one or more battery modules 12, and the stationary energy storage system 16 may include one or more of the stationary energy storage drawers 20.

By way of example, the battery module 12 may have a plurality of lithium ion battery cells, such as between 10 and 20. The general configuration of the battery module 12 will be described in further detail below. One or more of the battery modules 12 may be incorporated into the stationary energy storage drawer 20, several of which may connect with the larger stationary energy storage system 16 to provide a desired energy storage, energy conditioning, and/or energy output capability for a facility 24.

As shown, the facility 24 may include a building or similar setting normally connected to an electrical power grid 26 or other main source of energy to provide power for everyday power consumption. However, in other embodiments the facility 24 may be a facility that is not connected to the electrical power grid 26 and therefore completely relies on other means to provide electrical energy (e.g., the stationary storage system 16). Further, the facility 24 may be a home or other setting. The stationary energy storage system 16 may be incorporated into or otherwise connected to an electrical grid of the facility 24 to provide power as needed. As non-limiting examples, the stationary energy storage system 16 may provide power to the facility 24 as a backup to the electrical power grid 26 (e.g., due to power outage), for power conditioning, for supplementing power or offsetting power consumption from the electrical power grid 26, and so forth.

Figure 2:
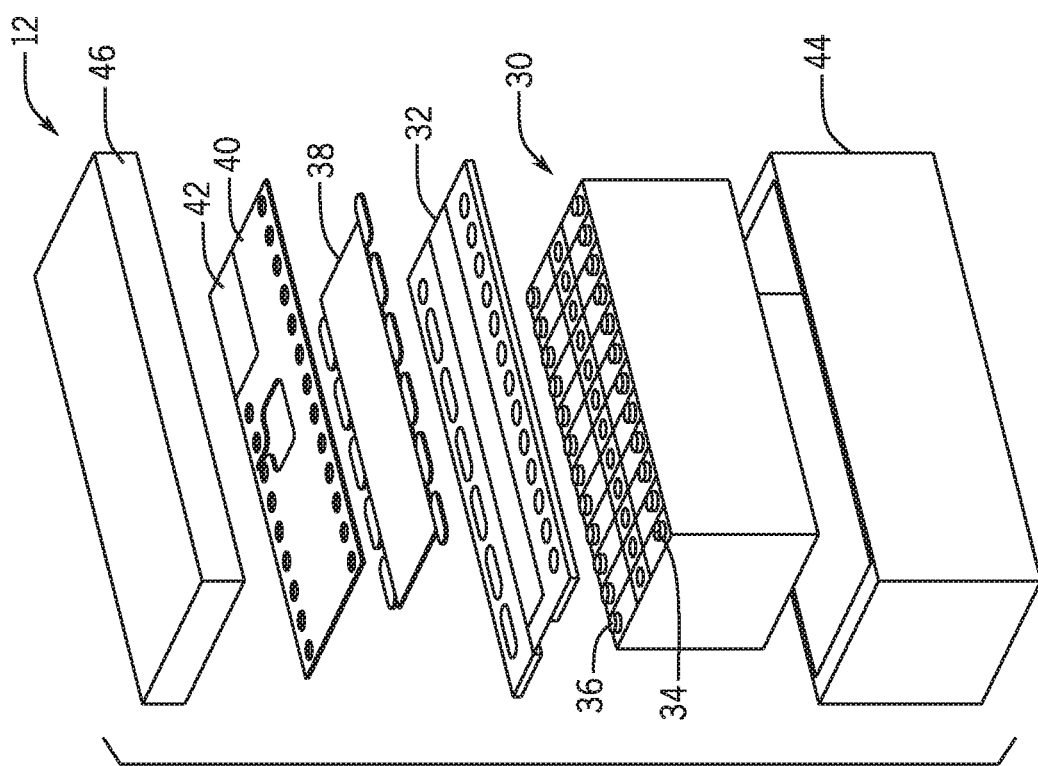
FIG. 2 is an exploded perspective view of the battery module of the stationary storage system illustrated in FIG. 1, in accordance with embodiments of the present approach.

FIG. 2 is an exploded perspective view of an embodiment of the battery module 12 of stationary storage system 16 illustrated in FIG. 1. As illustrated, certain embodiments of the battery module 12 include a plurality of prismatic lithium ion battery cells 30 (also referred to herein as "cells" for simplicity), which may be arranged in various configurations (e.g., orientations, orders of stacking). However, the cells 30 will generally be provided in an amount and configuration so as to have a sufficient energy density, voltage, current, capacity, and so forth, for a particular stationary application. As discussed in greater detail below, in different embodiments, the cells 30 may have a polymeric casing, or a metallic casing, or a combination, enclosing the electrochemically active components of the battery cells 30.

The battery module 12 of FIG. 2 includes a stack or lineup of the battery cells 30, with a bus bar carrier 32 being positioned over the terminals 34, 36 so as to enable electrical interconnection of the terminals 34, 36 using the bus bar assembly 38. The bus bar assembly 38 generally electrically connects the battery cells 30 as an electrical assembly. In certain embodiments, the bus bar assembly 38 may be integrated onto the bus bar carrier 32, in some instances along with other suitable features (e.g., voltage sense connectors).

For the illustrated embodiment, a traceboard 40 is positioned over the bus bar assembly 38 such that the bus bar assembly 38 is positioned between the traceboard 40 and the bus bar carrier 32. A battery management system (BMS) 42 is integrated onto the traceboard 40 to connect the BMS 42 to any sense features (e.g., temperature and/or voltage sense features) and to enable control of the cells 30 and the overall operation of the battery module 12. In some embodiments, the BMS 42 may also monitor and control operations of the stationary energy storage drawer 20.

The housing 44 of the illustrated embodiment completely encloses the cells 30 as well as some or all of the features described above with respect to FIG. 2. As illustrated, the module housing 44 takes the shape of its constituent battery cells 30; in this instance a prismatic form. However, the housing 44 may be formed to have any appropriate shape for a particular application. A cover 46 is provided above the BMS 42, traceboard 40, and bus bar assembly 38 and attaches to an upper portion of the battery module housing 44. The cover 46 is configured to substantially enclose the BMS 42, traceboard 40, and bus bar assembly 38 to prevent inadvertent contact with electrical and control components. Accordingly, the cover 46 may be formed from an electrically insulative material, which may be the same or different than the material forming the housing 44. In certain embodiments, the outer perimeter of the traceboard 40 may correspond to an inner perimeter of the cover 46.

Figure 3:
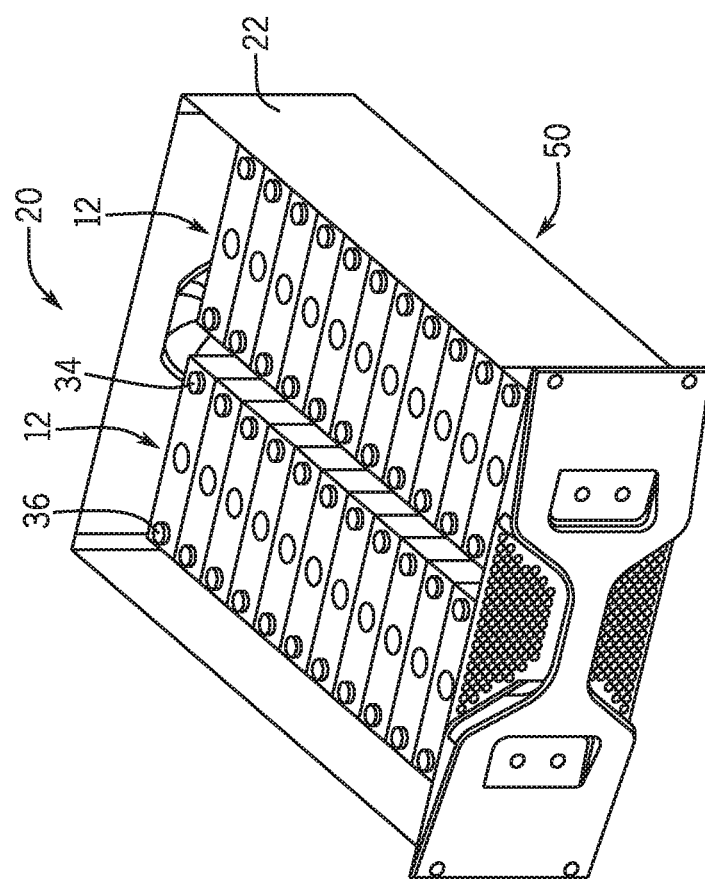
FIG. 3 is a perspective view of the stationary energy storage drawer of the stationary storage system illustrated in FIG. 1, in accordance with embodiments of the present approach.

Integrating battery modules 12 into the stationary energy storage drawer 20 may have a number of advantages and enable various configurations of the stationary energy storage drawer 20. For example, FIG. 3 depicts an embodiment of the stationary energy storage drawer 20 having two of the battery modules 12 (e.g., first and second battery modules 12) positioned side-by-side within a stationary drawer housing 52. Specifically, in FIG. 3, each of the battery modules 12 is secured within the stationary energy storage drawer 20 in an orientation in which respective terminals 34, 36 of the battery cells 30 are axially oriented crosswise relative to the base 50 of the stationary drawer housing 22. The stationary energy storage drawers 20 of the present disclosure may include various types of battery modules 12 (e.g., having the same or different capacities, voltages, sizes, shapes) to enable a flexible solution for various stationary energy storage applications.

Figure 4:
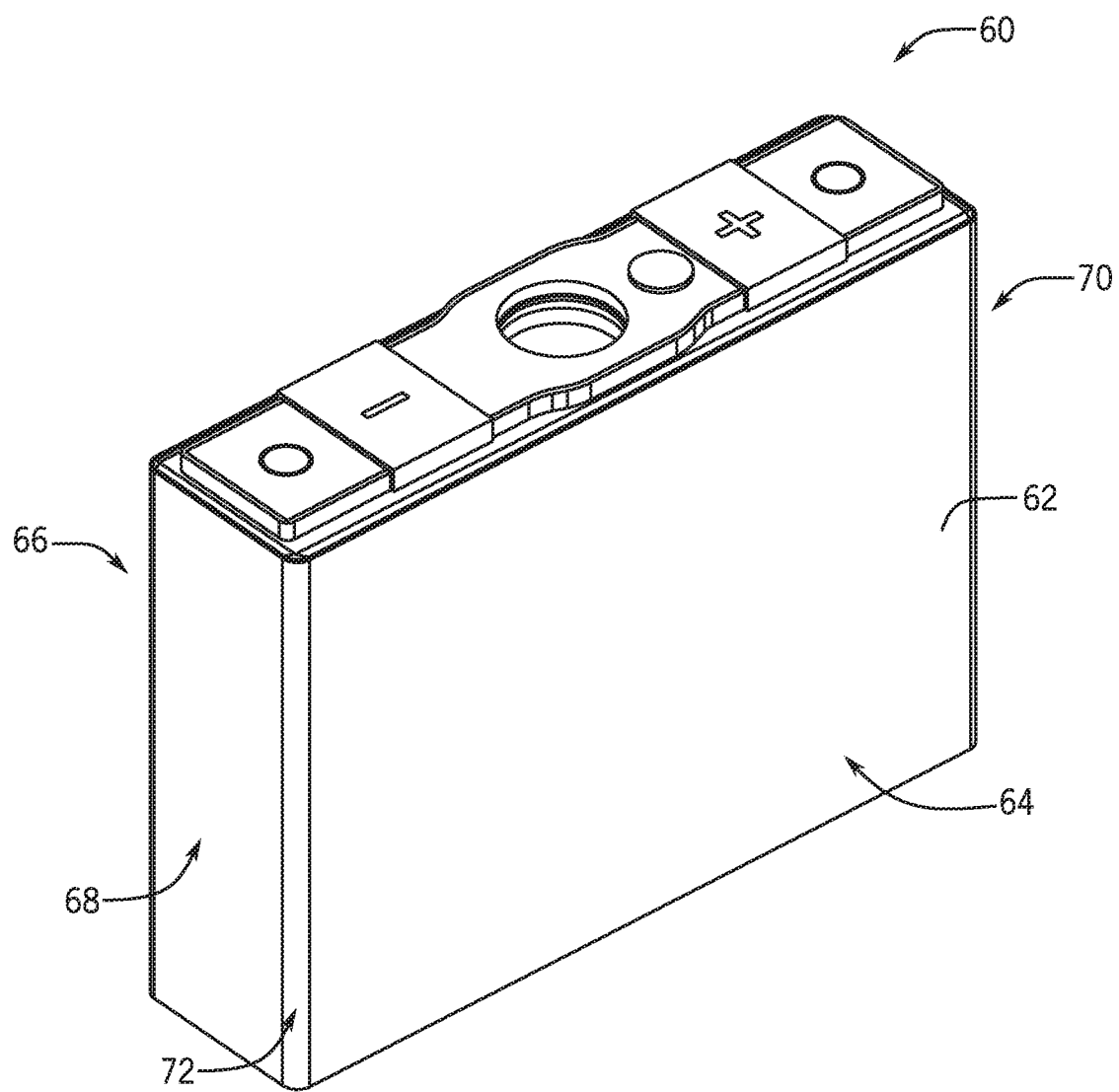
FIG. 4 is a perspective view of a prismatic lithium ion battery cell that includes an overcharge protection system, in accordance with embodiments of the present technique.

FIG. 4 is a perspective view of an embodiment of a prismatic lithium ion battery cell 60, in accordance with embodiments of the present approach. As used herein, "prismatic" refers to the generally box-like (e.g., polygonal) shape of the substantially rigid packaging 62 of the battery cell 60. As such, it should be appreciated that the disclosed prismatic cells 60 are distinct from pouch battery cells, which have a substantially flexible laminate packaging. Further, it should be appreciated that the disclosed prismatic cells 60 are also distinct from cylindrical battery cells, which have a substantially rigid cylindrical packaging. Those skilled in the art will appreciate that these different cell shapes and packaging materials present different limitations and modes of failure, and issues or solutions that are effective for one type of battery cell may not be applicable to others.

The packaging 62 of the illustrated prismatic lithium ion battery cell 60 may be generally described as having a first and a second substantially flat side portion, 64 and 66, disposed opposite one another. Additionally, the packaging 62 includes a first and a second end portion 68 and 70, disposed opposite one another. In certain embodiments, the end portions 68 and 70 may be substantially flat, rounded, or substantially flat will slight rounded corners 72, as illustrated.

Figure 5:
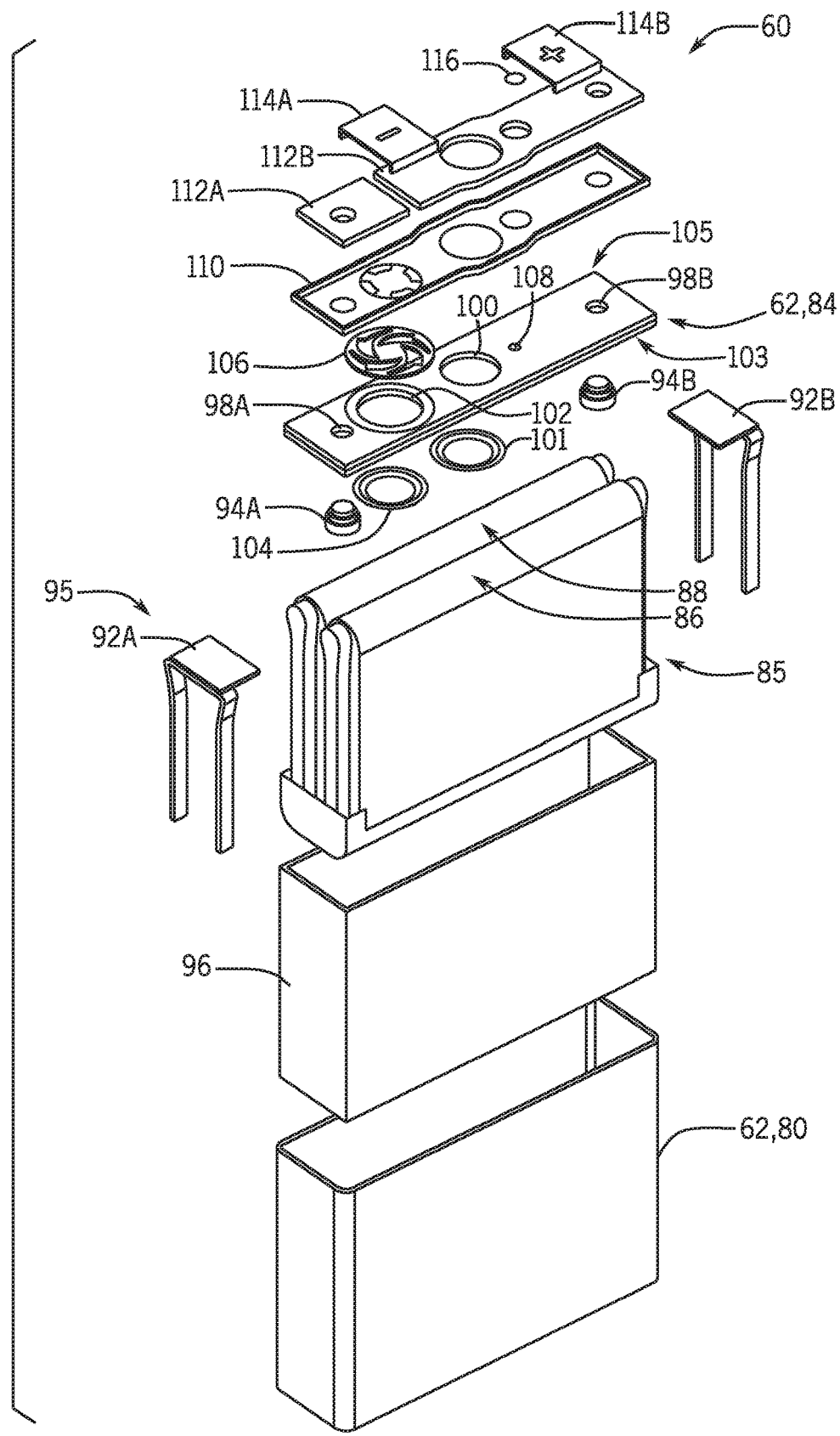
FIG. 5 is an exploded view of the prismatic lithium ion battery cell of FIG. 4, in accordance with embodiments of the present technique.

FIG. 5 is a perspective exploded view of the embodiment of the prismatic lithium ion battery cell 60 illustrated in FIG. 4. The packaging 62 of the illustrated battery cell 60 includes a can 80 that is coupled to (e.g., hermetically sealed to, welded to) a cover 84. In certain embodiments, the can 80 and cover 84 may both be made of metal (e.g., aluminum), while in other embodiments, one or both of the can 80 and cover 84 may be made of an electrically insulating material (e.g., polymer, polypropylene plastic). Once sealed together (e.g., via welding), the can 80 and cover 84 form a substantially rigid packaging that resists (e.g., blocks, prevents) expansion as pressure within the cell 60 increases (e.g., due to thermal expansion, due to an overcharging event) and as pressure is externally applied to the cell 60.

Figure 8A:
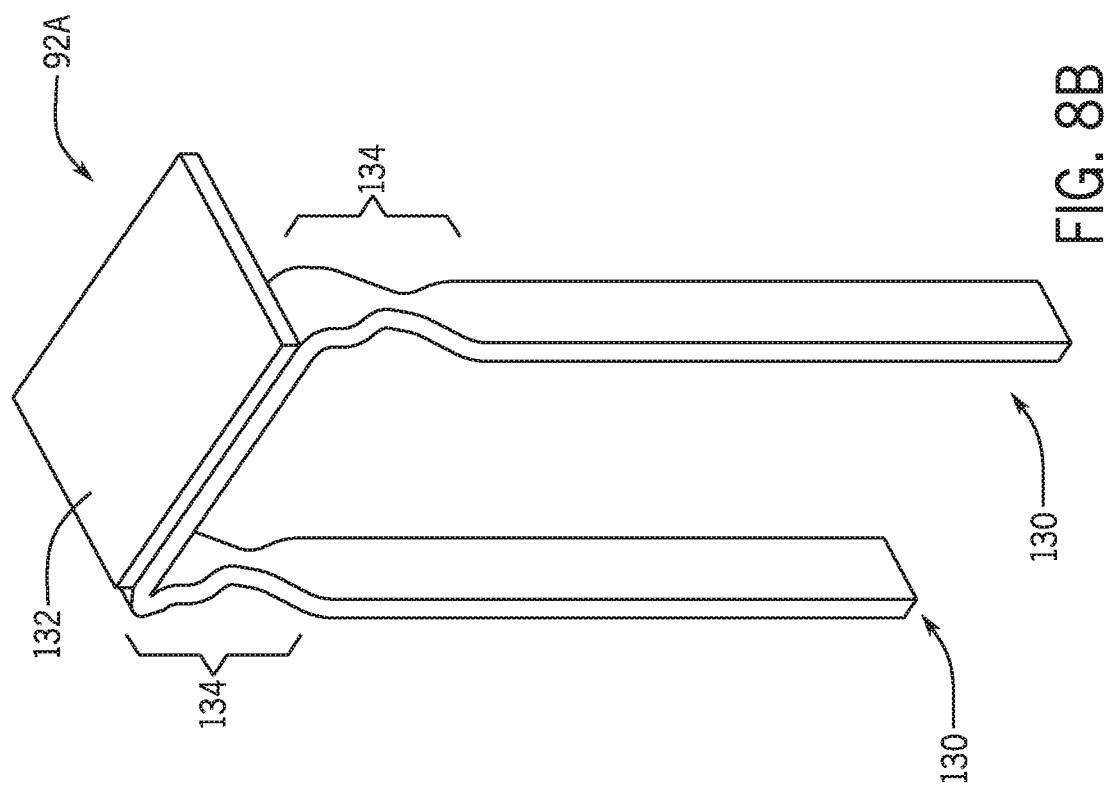
FIG. 8A is a perspective view of an example current collector for the prismatic lithium ion battery cell illustrated in FIG. 5 that lacks a fuse, in accordance with embodiments of the present technique.
Figure 8B:
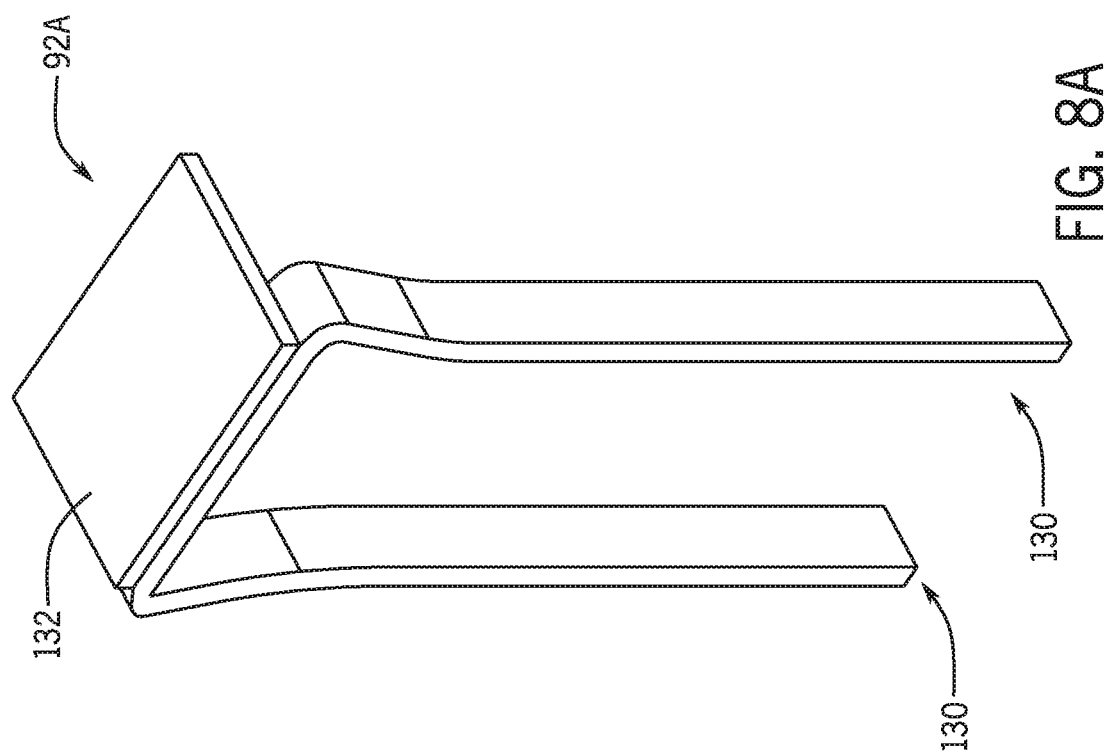
FIG. 8B is a perspective view of another example current collector for the prismatic lithium ion battery cell illustrated in FIG. 5 that includes a fuse, in accordance with embodiments of the present technique.

Within the can 80, the illustrated prismatic lithium ion battery cell 60 includes a stack 85 having two electrode (e.g., cathode/anode) coils 86 and 88. Each of the coils 86 and 88 include a cathode layer and an anode layer, along with suitable separating layers, that are wound together to form the charge storage elements of the cell 60. In other embodiments, a cell 60 may include only one coil, or include a stack 85 having three, four, five, or more coils, in accordance with the present disclosure. Current collectors 92A and 92B, which are discussed in greater detail below with respect to FIGS. 8A and 8B, are welded to the appropriate electrode (e.g., cathode or anode) at the ends of the coils 86 and 88 of the coil stack 85. Additionally, terminal posts 94A and 94B are welded to the current collectors 92A and 92B, respectively, to yield an assembled power assembly 95 of the cell 60. The assembled power assembly 95 may be generally described herein as having a first or negative side (e.g., corresponding to the current collector 92A) and a second or positive side (e.g., corresponding to the current collector 92B) that are respectively coupled to the terminal pads 112A and 112B. Additionally, an insulation pouch 96 wraps a sufficient amount of the power assembly 95 to electrically isolate the power assembly 95 from the can 80 of the battery cell 60.

The cover 84 is disposed above the power assembly 95, having the terminal posts 94A and 94B extending through (and hermetically sealed within) corresponding openings 98A and 98B defined in the cover 84. The illustrated cover 84 includes an opening 100 about which a vent disk 101 is sealed (e.g., welded) to a bottom side 103 of the cover 84, wherein the top side 105 faces away from the power assembly 95. Additionally, the illustrated cover 84 includes an opening 102, and a reversal disk 104 is sealed (e.g., welded) about the opening 102 on the bottom side 103 of the cover 84, while a conductive element (e.g., spiral disk feature 106, or another suitable conductive member) is welded to a top side 105 of the cover 84. The cover 84 further includes a fill hole 108 for adding electrolyte to the cell 60 after assembly.

In certain embodiments, the reversal disk 104 may be made of a suitable metallic or polymeric material and have suitable dimensions (e.g., thickness, diameter) to deflect (e.g., invert) when the pressure within the packaging 62 of the cell 60 reaches or exceeds a particular threshold value. In certain embodiments, the vent disk 101 is sized, designed, and configured to activate at a threshold pressure greater than the threshold pressure of the reversal disk 104 at least 50% greater (e.g., between 50% and 80% greater) to ensure that the reversal disk 104 externally short-circuits the cell 60 before effluent is released from the interior of the cell 60 by the vent disk 101.

Further, by using the disclosed conductive element (e.g., spiral disk feature 106, as discussed for embodiments below with respect to FIGS. 5, 6, 7, 9 and 14, or another suitable conductive member 180, as discussed for embodiments below with respect to FIGS. 12 and 13) the presently disclosed reversal disk 104 can be substantially thinner and activate in response to substantially lower pressures (e.g., less than 6 bar, about 3-4 bar) than the activation pressures of designs in which the external short-circuit must traverse a thicker reversal disk 104 (e.g., at activation pressures greater than about 6 bar). That is, in the present designs, the reversal disk 104 is not required to be part of the short-circuit path or required to carry a substantial amount of current. Rather, in the present designs, the reversal disk 104 displaces the conductive element (e.g., a spiral disk feature 106 or a conductive member 180) with a substantially greater current capacity to form the external short-circuit with one or both of the terminal pads. For example, for the embodiment illustrated in FIG. 5, the conductive element (i.e., spiral disk feature 106) contacts both terminal pads 112A and 112B once the reversal disk 104 is deployed to form a short-circuit pathway. It may be appreciated that since, in certain embodiments, the reversal disk 104 may be in electrical contact with the conductive element (e.g., spiral disk feature 106 or conductive member 180), a small portion of the short-circuit current may traverse or electrify the reversal disk 104, the cover 84, and the packaging 62 of the battery cell 60 for such embodiments. However, the conductive element may be substantially (e.g., 2×-10×, 5×-10×) thicker, or have portions that are substantially thicker, than the reversal disk 104. As such, it is presently recognized that the conductive element (e.g., spiral disk feature 106 or conductive member 180) demonstrates substantially lower electrical resistance than the reversal disk 104. Accordingly, for such embodiments, a substantial portion of the short-circuit current traverses the lower resistance spiral disk feature 106 or conductive member 180 instead of the reversal disk 104. In other embodiments discussed below, the reversal disk 104 may be electrically insulated from the conductive element (e.g., conductive member 180) via an electrically insulating layer (e.g., via insulating layer 182 illustrated in FIGS. 12A and 12B) such that the short-circuit current is substantially blocked or prevented from reaching the reversal disk 104, the cover 84, or any other portion of the packaging 62 of the battery cell 60. It may be appreciated that this generally reduces the risk of electrical damage to components that may be in contact with the packaging 62 of the battery cell 60 within the battery module 12 during the short-circuit event. As such, the disclosed CDD design enables improved current carrying capability, greater sensitivity (e.g., lower pressure threshold), and more short-circuit pathway options than other CDD designs.

In the illustrated embodiment, a polymeric terminal insulator 110 is disposed over the cover and provides selective electrical isolation between certain metallic features of the cell 60. For example, the terminal insulator 110 generally defines openings to allow certain components (e.g., terminal posts 94A and 94B, spiral disk feature 106) to pass through (e.g., extend through, deflect through) the terminal insulator 110, as desired. Additionally, the terminal insulator 110 electrically isolates portions of the cover 84 from one or both terminal pads 112A and 112B in certain embodiments.

The terminal pads 112A and 112B of the illustrated cell 60 are coupled to the terminal posts 94A and 94B, respectively, and are disposed above the terminal insulator 110 and the cover 84 of the battery cell 60. The illustrated cell 60 also includes electrically insulating terminal covers 114A and 114B respectively disposed over portions of the terminal pads 112A and 112B, which help to avoid accidental contact with or between the terminal pads 112A and 112B. Additionally, the illustrated cell 60 includes a fill hole seal disk 116 that seals the fill hole 108 of the cover 84 after the interior of the cell 60 is filled with electrolyte, as previously mentioned.

Figure 6A:
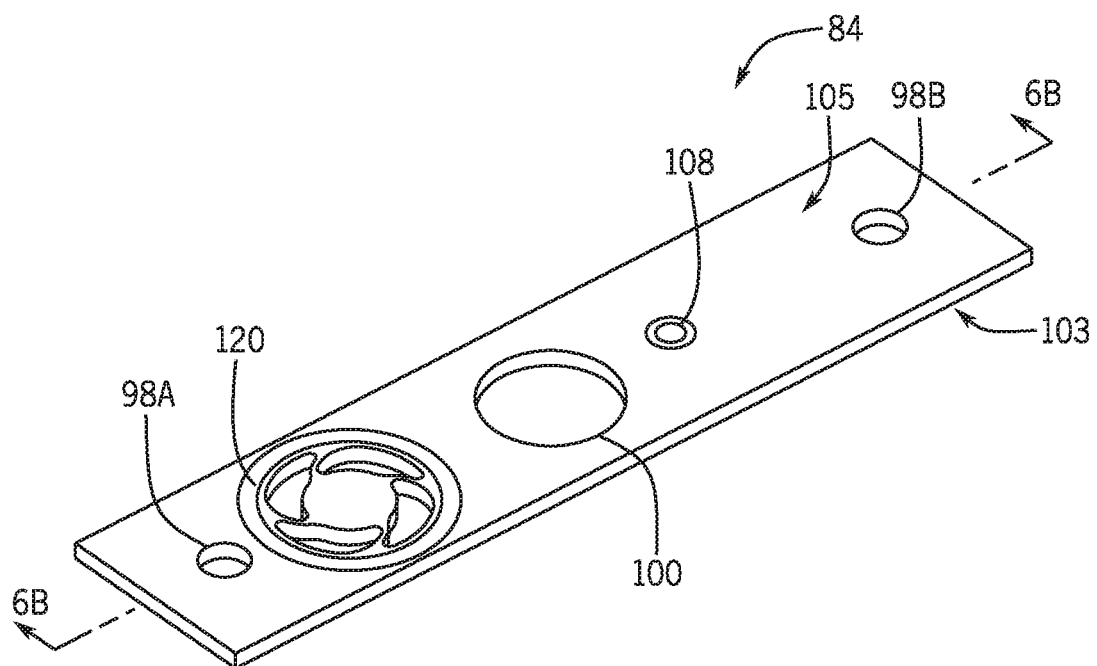
FIGS. 6A and 6B are perspective and cross-sectional views, respectively, of an example cover for the prismatic lithium ion battery cell illustrated in FIG. 5, in accordance with embodiments of the present technique.
Figure 6B:
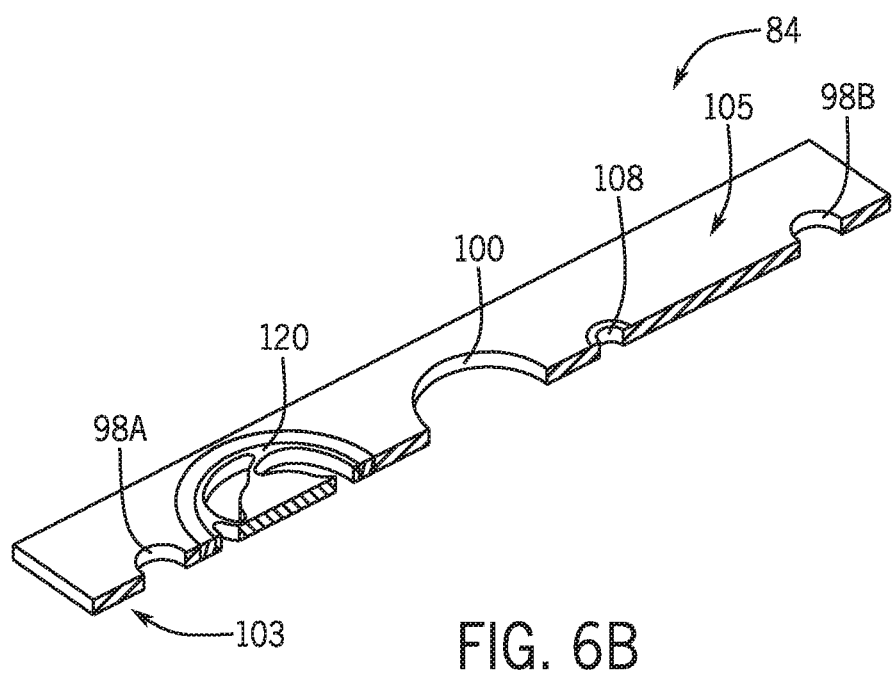

FIG. 6A is a perspective of another embodiment of a cover 84 of a prismatic lithium ion battery cell 60, in accordance with the present approach. FIG. 6B is a cross-sectional view of the embodiment of the cover 84 of FIG. 6A, taken along line 6B. The illustrated cover 84 includes and/or defines certain features described above, including openings 98A and 98B that correspond to terminal posts 94A and 94B, respectively, opening 100 corresponding to the vent disk 101, and the fill hole 108. However, instead of the opening 102 illustrated in the cover 84 of FIG. 5, the cover 84 of FIGS. 6A and 6B includes an integrated spiral disk feature 120 formed in relief. For example, a metallic cover 84 as illustrated may be fabricated using a stamping and/or pressing operation that simultaneously forms the features of the illustrated cover 84, including the integrated spiral disk feature 120 formed in relief. As such, the illustrated integrated spiral disk feature design reduces manufacturing time and costs, and provides a more reliable (e.g., thicker, more controlled, more regular) connection between the spiral member 120 and the cover 84 for the external short-circuit to traverse compared to other designs.

Figure 7:
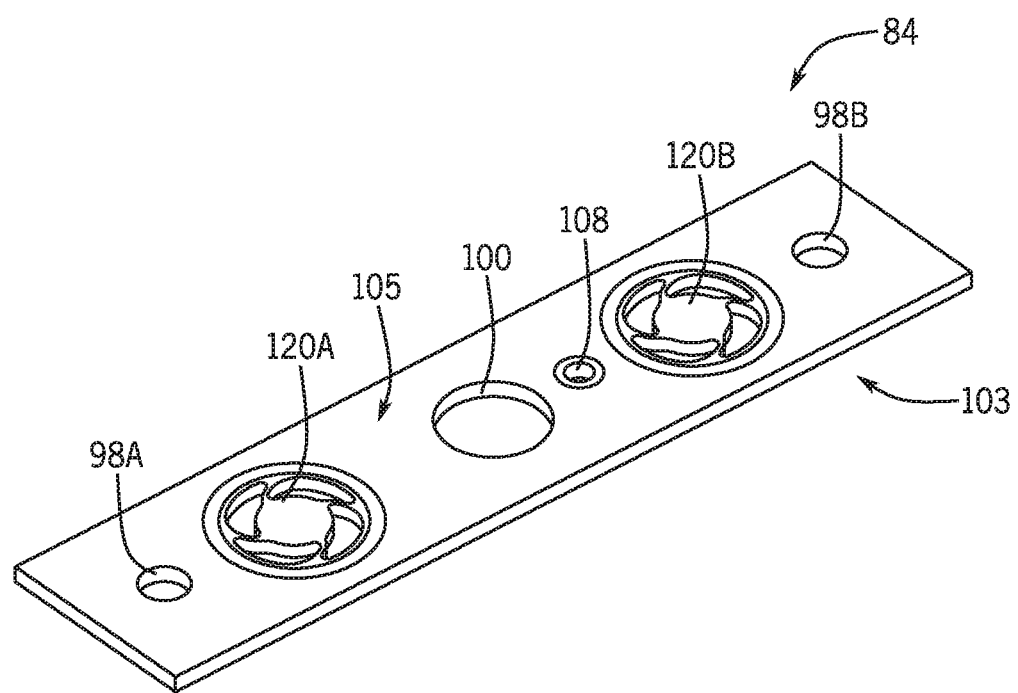
FIG. 7 is a perspective view of another example cover for the prismatic lithium ion battery cell illustrated in FIG. 5, wherein the cover includes dual integrated spiral disk features, in accordance with embodiments of the present technique.

FIG. 7 is a perspective view of another embodiment of the cover 84 for the prismatic lithium ion battery cell 60 illustrated in FIG. 5. Again, the illustrated cover 84 includes and/or defines features described above, including openings 98A and 98B that correspond to terminal posts 94A and 94B, respectively, opening 100 corresponding to the vent disk 101, and the fill hole 108. However, the cover 84 of FIGS. 6A and 6B includes dual integrated spiral disk features 120A and 120B formed in relief. For embodiments of the CDD that include the illustrated cover 84 with the dual integrated spiral disk features 120A and 120B, a respective reversal disk 104 is sealed (e.g., welded) to the bottom side 103 of the cover 84 below each disk. The operation of the cover 84 with dual integrated spiral disk features 120A and 120B is discussed below with respect to FIG. 11.

FIGS. 8A and 8B are perspective views of different embodiments of the current collector 92A for the prismatic lithium ion battery cell 60 illustrated in FIG. 5. Both illustrated current collectors 92A include extensions 130 that are welded to the corresponding electrodes of the coils (e.g., coils 86, 88), and also include the platform 132 onto which the terminal post 94A is welded, as mentioned above. However, the embodiment of the current collector 92A illustrated in FIG. 8B includes one or more fuses 134, while the embodiment of the current collector 92A illustrated in FIG. 8A lacks any such fuse feature.

Therefore, it may be noted that, in certain embodiments, at least one of the current collectors (e.g., current collector 92A, current collector 92B, or both) that electrically couples an electrode (e.g., cathode or anode) to its corresponding terminal pad may include such a fuse 134 that preferentially melts and fails before other portions of the power assembly 95 of the cell 60 in response to an external short-circuit. In contrast, for embodiments that include current collector 92A of FIG. 8A that lacks such fuse features, when the cell 60 is externally short-circuited, an unexpected (e.g., unplanned, random) portion of the power assembly 95 melts and fails, interrupting continuity between an electrode (e.g., cathode or anode) and the corresponding terminal of a battery cell. By disconnecting at least one electrode from the corresponding terminal in response to an induced external short-circuit, present embodiments enable an automatic cut-off of current within the cell 60 in response to an overcharge event, which protects the cell 60 from thermal runaway and limits damage within a battery module 12 and/or a stationary energy storage system 16 that includes the cell 60.

Figure 9:
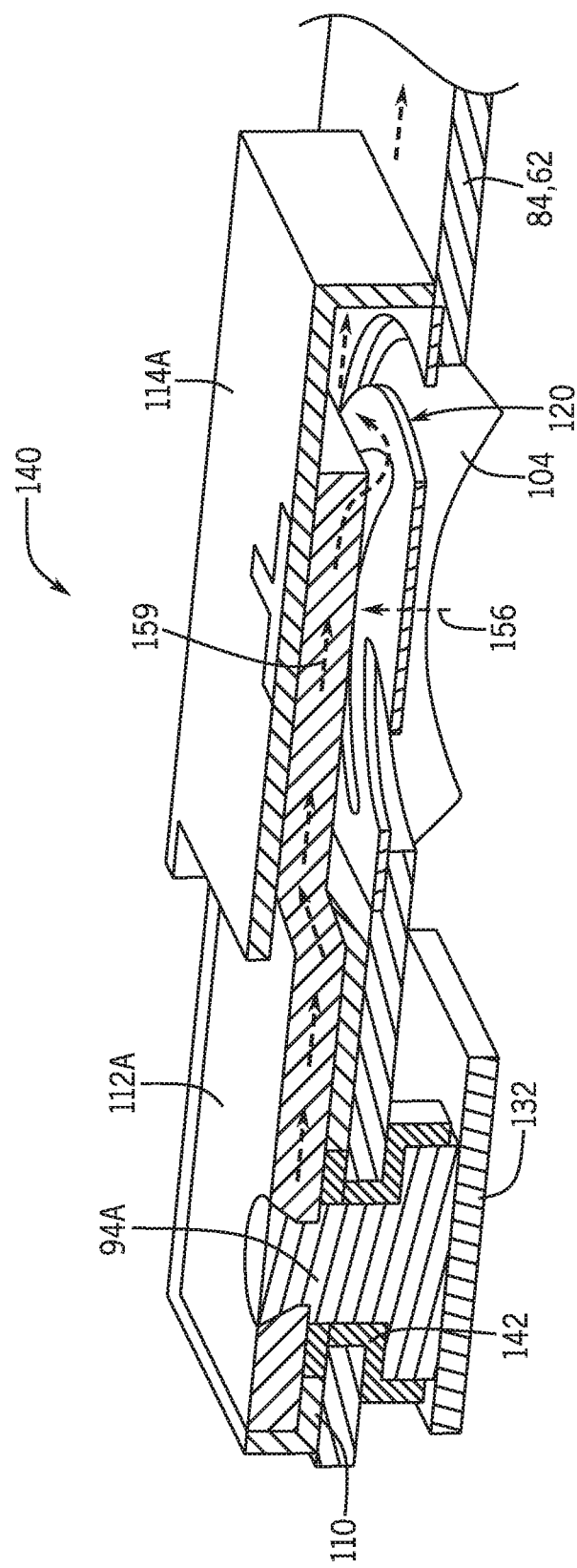
FIG. 9 is a cross-sectional view of an assembled current diverge device (CDD) of an overcharge protection system of a prismatic lithium ion battery cell, in accordance with embodiments of the present technique.

FIG. 9 is a cross-sectional view of an embodiment of an assembled current diverge device (CDD) 140 of an overcharge protection system for the prismatic lithium ion battery cell 60. More specifically, for the embodiment of the CDD 140 illustrated in FIG. 9 and discussed below, the opposite terminal (not illustrated) is electrically coupled to the cover 84 of the packaging 62 of the battery cell 60. In certain embodiments, either the positive side or the negative side of the power assembly 95 is electrically coupled to the cover 84, while the opposite (e.g., positive or negative) side of the power assembly 95 is electrically coupled to the illustrated terminal 112A disposed above the reversal disk 104 and spiral disk feature 106. It should be appreciated that the design illustrated in FIG. 9 is also representative of one terminal region for an embodiment of a CDD 140 that includes a reversal disk 104 and a spiral disk 106 disposed below both terminal pads 112, as discussed below with respect to FIG. 11.

Figure 10:
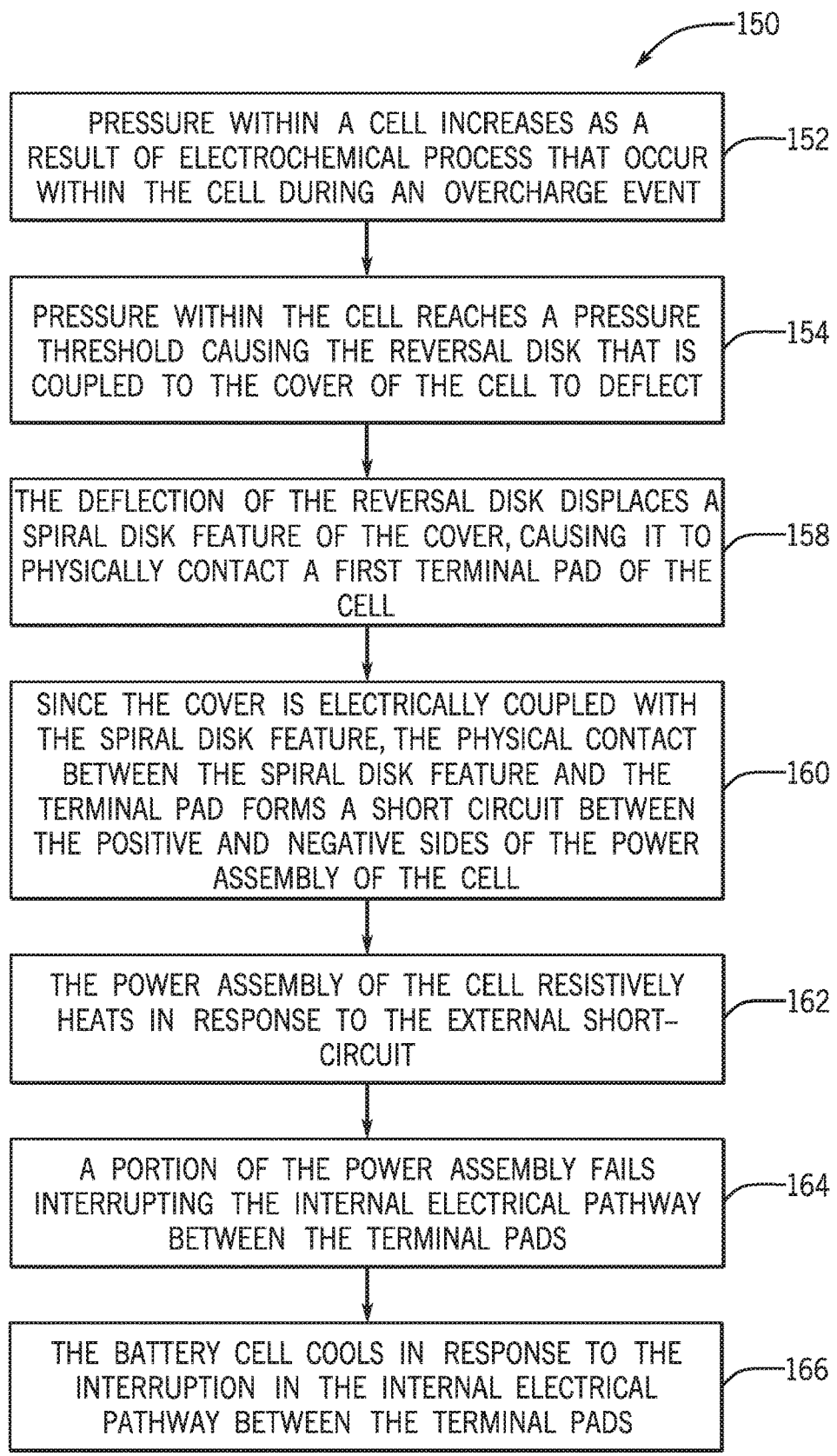
FIG. 10 is a flow diagram of a process by which an overcharge protection system of a prismatic lithium ion battery cell having a CDD with a single integrated spiral disk feature interrupts current flow between the terminal pads of the cell in response to an overcharge event, in accordance with embodiments of the present technique.

In addition to the components described above, the illustrated embodiment of FIG. 9 includes a gasket 142 positioned between the terminal post 92A and the cover 84. For embodiments in which the cover 84 is metallic, the gasket 142 electrically isolates the terminal post 94A from the cover 84. FIG. 10 is a flow diagram of a process 150 by which an embodiment of the overcharge protection system of the prismatic lithium ion battery cell 60 having a CDD with a single integrated spiral disk feature 120 and a packaging 62 with positive polarity interrupts current flow between the terminal pads 112A and 112B of the cell 60 in response to an overcharge event. As such, FIG. 10 is discussed below in the context of the CDD 140 illustrated in FIG. 9. For this example, the CDD 140 of the overcharge protection system includes a single reversal disk 104 and a single integrated spiral disk feature 120 disposed under a portion of the terminal pad 112A that is not electrically coupled to the cover 84 or packaging 62 of the cell 60. As mentioned, the other terminal pad 112B (not shown) is electrically coupled to the cover 84 and packaging 62, resulting in a biased (e.g., positively biased) cover 84 and packaging 62.

For this example embodiment, the illustrated process 150 begins with the pressure in the cell 60 increasing in response to aforementioned electrochemical processes (e.g., thermal expansion, electrolyte decomposition) that occur within the interior of the cell 60 as a result of an overcharge event (block 152). When the pressure in the cell 60 reaches a pressure threshold, based on the dimensions of the reversal disk 104, the reversal disk 104 deflects upwards (e.g., outwards from the interior of the cell 60, as indicated by the arrow 156 in FIG. 9) (block 154). This deflection provides sufficient force to displace (e.g., deflect, bend, twist, and/or otherwise deform) the spiral disk feature 120 upwards (e.g., in direction 156) towards a the terminal pad 112A disposed above the integrated spiral disk feature 120 (block 158).

For the illustrated example, since the cover 84 is physically and electrically coupled with the spiral disk feature 120, the physical contact between the spiral disk 120 and the terminal pad 112B forms a short circuit between the positive and negative sides of the power assembly 95 of the cell 60. In other words, since the cover 84 of the packaging 62 is biased (e.g., positively biased), the physical contact between the integrated spiral disk feature 120 and the terminal pad 112A set forth in block 158 forms a short-circuit, as indicated by the arrows 159 (see FIG. 9) between positive and negative sides of the power assembly 95, wherein the short-circuit current passes through the cover 84 of the cell (block 160). The power assembly 95 of the cell 60 resistively heats in response to the external short-circuit (block 162) until a portion (e.g., the fuse 134 illustrated in FIG. 8B, or a random/unplanned portion) of the power assembly 95 fails in response to the resistive heating, interrupting the internal electrical pathway and electrical current between the terminal pads 112A and 112B. The cell 60 subsequently cools in response to the interruption in the internal electrical pathway between the terminal pads 112A and 112B as the overcharge event is mitigated/interrupted.

Figure 11:
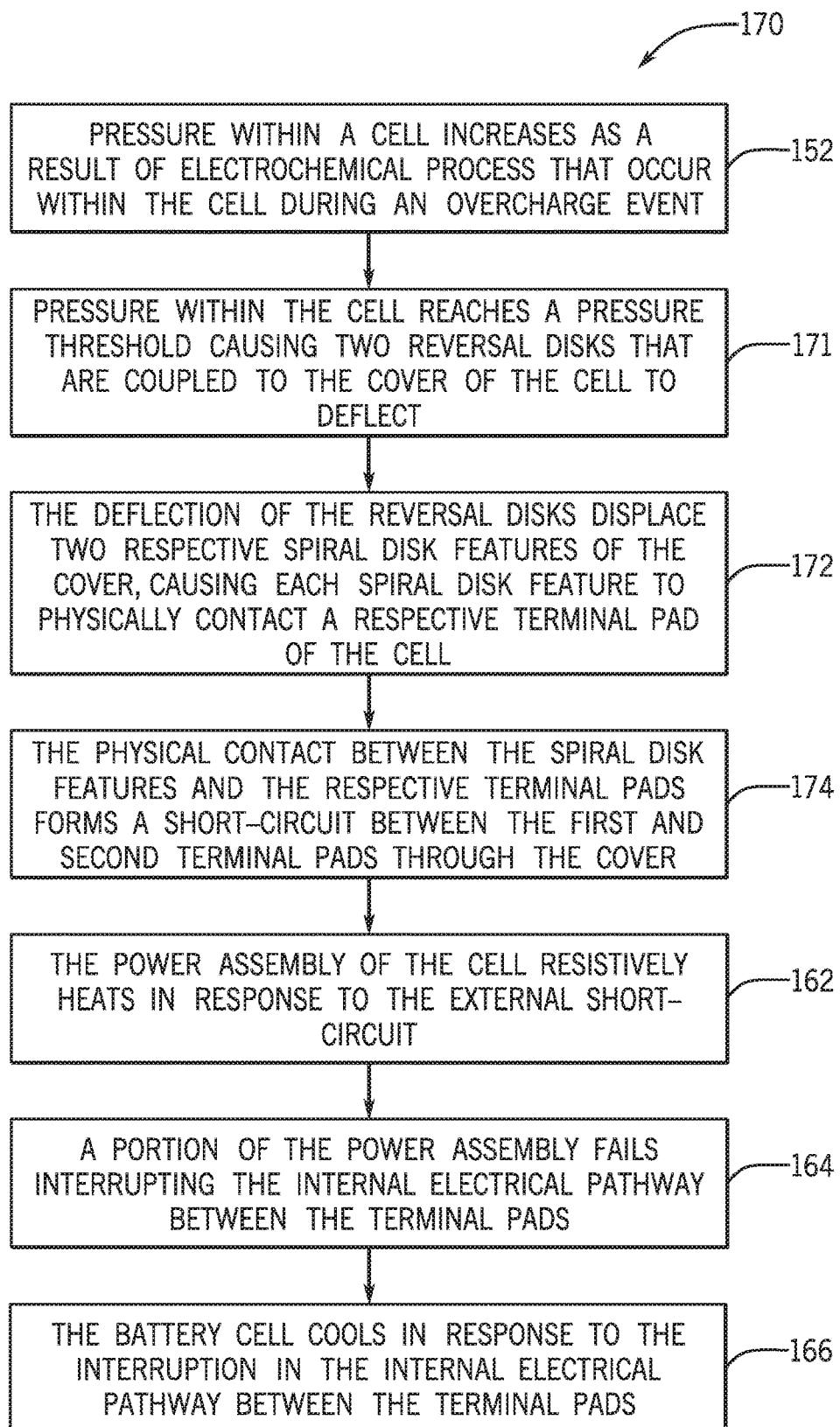
FIG. 11 is a flow diagram of a process by which an overcharge protection system of a prismatic lithium ion battery cell having a CDD with dual integrated spiral disk features interrupts current flow between the terminal pads of the cell in response to an overcharge event, in accordance with embodiments of the present technique.

FIG. 11 illustrates a process 170 whereby an embodiment of the disclosed overcharge protection system responds to an overcharge event within a battery cell having a neutral, unbiased packaging 62 (e.g., the cover 84 is electrically insulated from the terminal pads 112A and 112B and terminal posts 94A and 94B). For such an embodiment, the CDD of the overcharge protection system includes two reversal disks and two corresponding integrated spiral disk features disposed under a portion of the terminal pads 112A and 112B, respectively. As such, the process 170 corresponds to an embodiment of the CDD having the cover 84 of FIG. 7, which includes the dual integrated spiral disk features 120A and 120B.

Like the process 150 illustrated in FIG. 10, the process 170 illustrated in FIG. 11 begins with the pressure in the cell 60 increasing in response to the overcharge event (block 152). When the pressure in the cell 60 reaches a pressure threshold, based on the dimensions of the reversal disks 104, the reversal disks 104 both deflect upwards (e.g., as illustrated by the arrow 156 in FIG. 9) (block 171). This deflection provides sufficient force to displace (e.g., deflect, bend, twist, deform) the integrated spiral disk features 120A and 120B upwards (e.g., as illustrated by the arrow 156 in FIG. 9) towards the terminal pads 112A and 112B, respectively (block 172). In this example, the physical contact between the integrated spiral disk feature 120A and the terminal pad 112A, in addition to the physical and electrical contact between the integrated spiral disk feature 120B and the terminal pad 112B, forms a short-circuit between the terminal pads 112A and 112B, wherein the short-circuit current again passes through the cover 84 of the cell (block 174). Similar to the process 150 of FIG. 10, as illustrated in FIG. 11, the power assembly 95 of the cell 60 resistively heats in response to the external short-circuit (block 162) until a portion of the power assembly 95 fails (block 164), and the cell 60 subsequently cools in response to the interruption in the internal electrical pathway and current between the terminal pads 112A and 112B as the overcharge event is mitigated/interrupted.

FIG. 12A is a cross-sectional schematic view of another embodiment of an assembled CDD 140 of an overcharge protection system of a prismatic lithium ion battery cell 60 before activation. FIG. 12B is a cross-sectional view of the CDD of FIG. 12A after activation. The illustrated embodiment includes certain similar components to the ones discussed above, including terminal pads 112A and 112B, terminal insulator 110, cover 84, and reversal disk 104. The illustrated reversal disk 104 is disposed in a central region between and below the terminal pads 112A and 112B. The illustrated embodiment further includes a conductive element (e.g., conductive member 180), which is illustrated as a flat metallic disk that is disposed above the reversal disk 104. In other embodiments, the conductive member 180 may be implemented as all or a portion of a spiral disk feature that is coupled or integrated into the cover 62 of the battery cell 60. The illustrated design also includes an electrically insulating layer 182 disposed between the conductive member 180 and the reversal disk 104. For example, in certain embodiments, the insulating layer 182 can include an adhesive to enable the conductive member 180 to attach to the reversal disk 104. In other embodiments, the insulating layer 182 may additionally or alternatively include snap features to secure the conductive member 180 to the surface of the reversal disk 104.

Figure 14A:
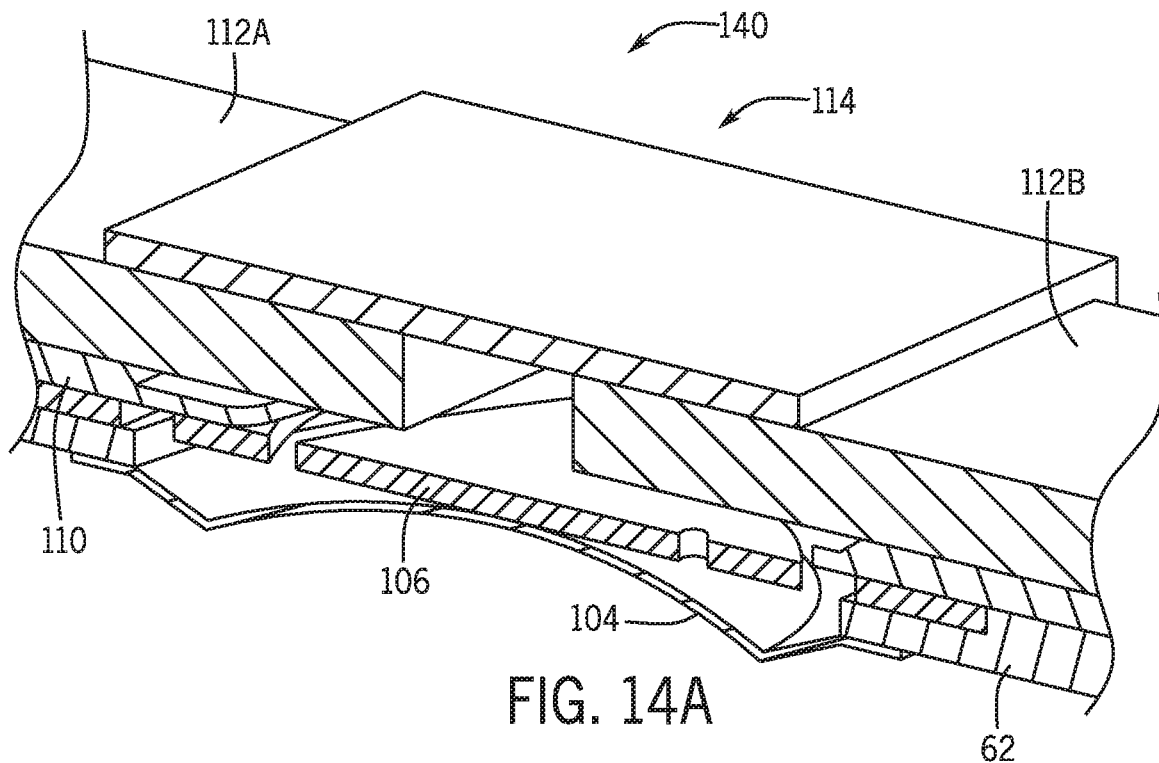
FIG. 14A is a cross-sectional view of another embodiment of an assembled CDD of an overcharge protection system of a prismatic lithium ion battery cell before activation, in accordance with embodiments of the present technique.
Figure 14B:
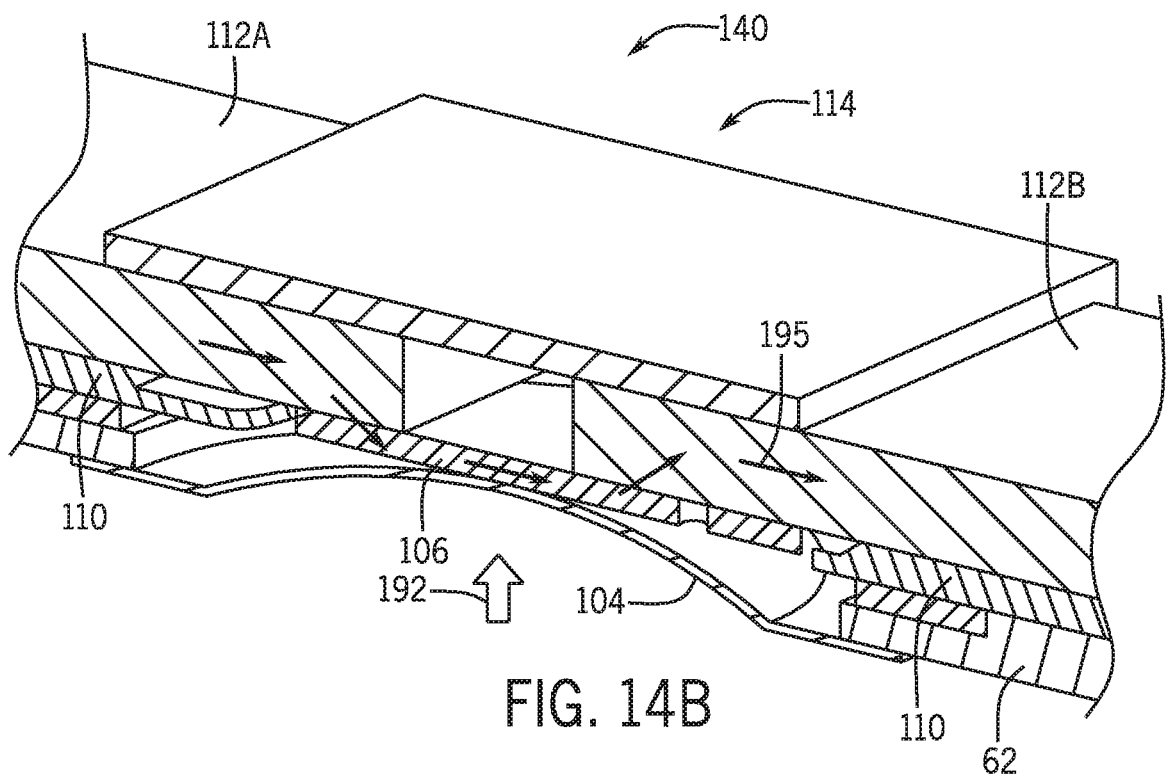
FIG. 14B is a cross-sectional view of the CDD of FIG. 14A after activation, in accordance with embodiments of the present technique.

FIG. 14A is a cross-sectional schematic view of yet another embodiment of an assembled CDD 140 of an overcharge protection system of a prismatic lithium ion battery cell 60 before activation. FIG. 14B is a cross-sectional view of the CDD 140 of FIG. 14A after activation. Like the design illustrated in FIGS. 12A and 12B, for the design illustrated in FIGS. 14A and 14B, the cover 62, and/or the remainder of the packaging 84, may be made of a conductive (e.g., metallic) or non-conductive (e.g., polymeric) material. For embodiments having a conductive cover 62 and/or packaging 84, the cover 62 and packaging 84 may be electrically isolated from both terminal pads 112A and 112B such that the packaging 84 of the battery cell 60 is unbiased until the activation of the CDD, as illustrated in FIGS. 12B and 14B. For the embodiment illustrated in FIGS. 14A and 14B, the conductive element is implemented as a spiral disk feature 106 that is disposed above the reversal disk 104. The embodiment illustrated in FIGS. 14A and 14B lacks the electrically insulating layer 182 disposed between the conductive element (e.g., the conductive member 180 or the spiral disk feature 106) and the reversal disk 104, as illustrated in FIGS. 12A and 12B. As such, the reversal disk 104, as well as the cover 62, is in electrical contact with the spiral disk feature 106 for the embodiment illustrated in FIGS. 14A and 14B.

Figure 15:
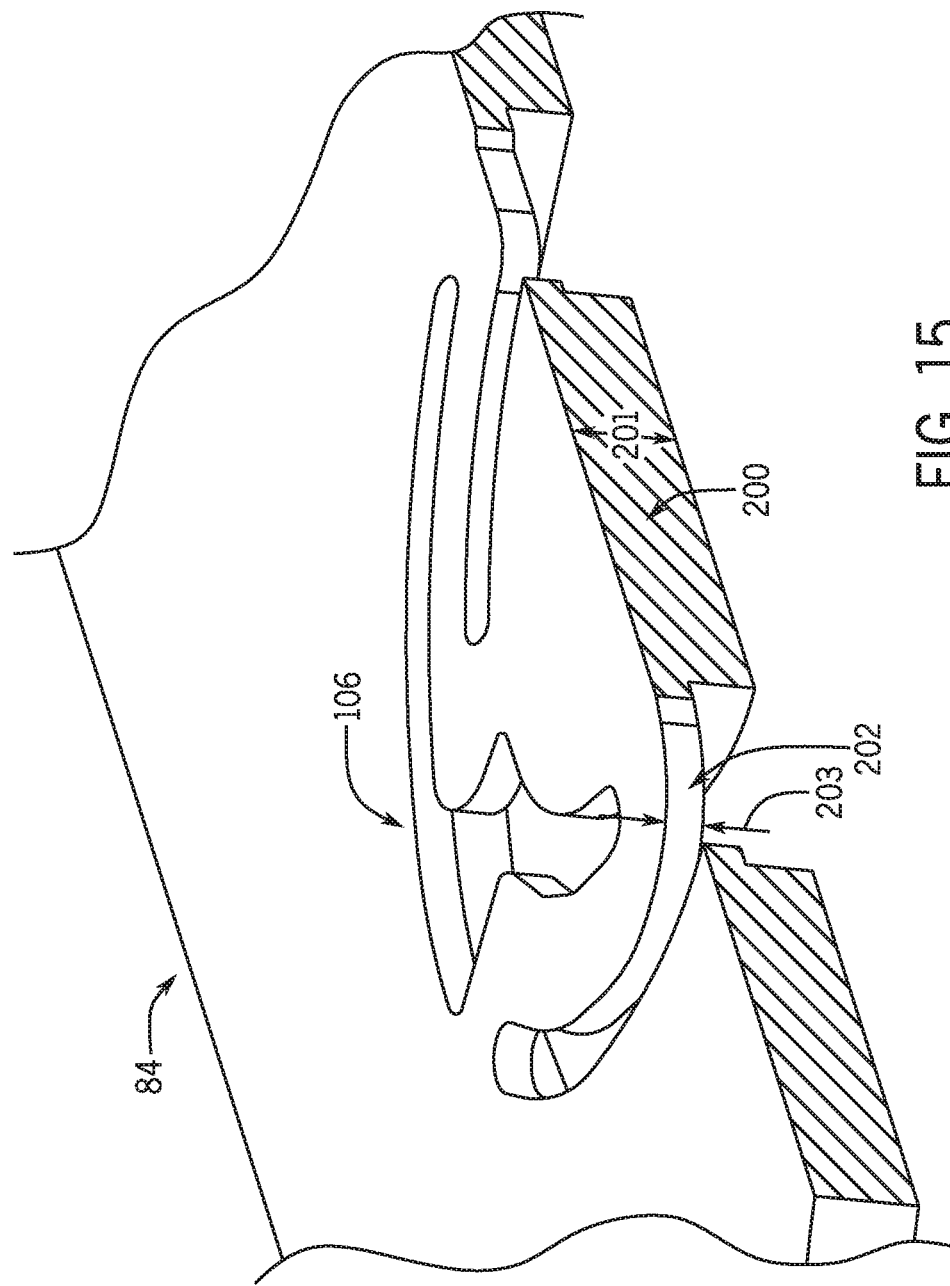
FIG. 15 is a cross-sectional view of a spiral disk feature having a relatively thicker central portion and relatively thinner leg portions, in accordance with embodiments of the present technique.

Additionally, FIG. 15 illustrates a cross-sectional view of a conductive element (i.e., a spiral disk feature 106) of a cover 84 of a battery cell 60 that can be used for embodiments of the CDD in which the conductive element contacts both terminal pads 112A and 112B, such as those illustrated in FIGS. 5 and 14. As illustrated in FIG. 15, the spiral disk feature 106 includes a central portion 200 having a first thickness 201, which facilitates the passage of current between the terminal pads 112A and 112B. In certain embodiments, the central portion 200 of the spiral disk feature 106 may be used and/or referred to as a conductive member 180 (e.g., conductive member 180 in FIGS. 12A and 12B). The relatively thicker central portion 200 is coupled to the cover 84 via a plurality of legs 202 having a second thickness 203, which enables deflection of the central portion 200 by the reversal disk 104. As illustrated, the first thickness 201 may be substantially greater than the second thickness 203, in certain embodiments. In other words, since the legs 202 of the spiral disk feature 106 are not required to carry the short-circuit current for the illustrated embodiment (as illustrated in FIG. 14B), the legs 202 can be substantially (e.g., 2×-5×) thinner than the central portion 200 of the spiral disk feature 106, which reduces the force required to displace the spiral disk feature 106 to contact the terminal pads 112A and 112B.

Figure 13:
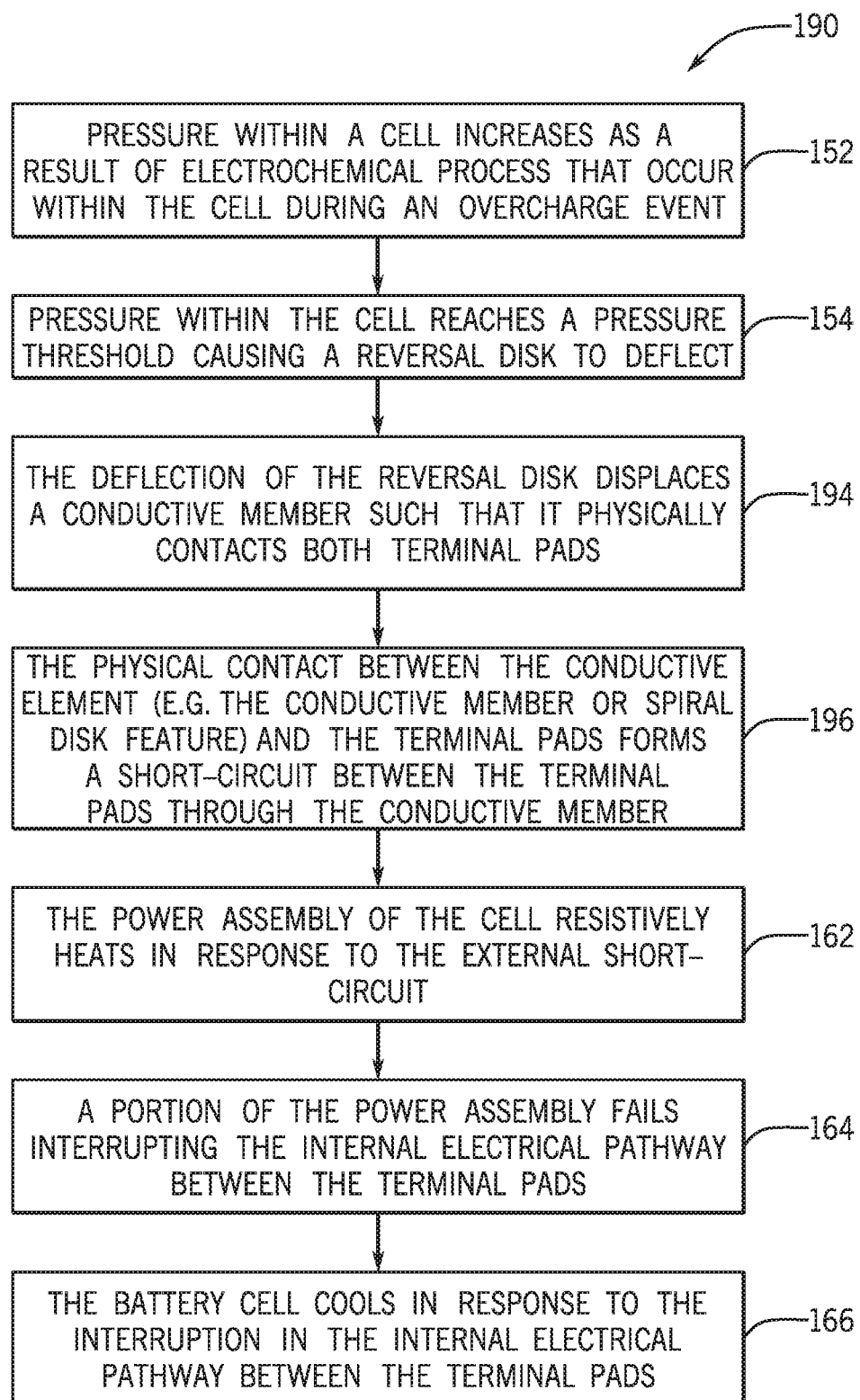
FIG. 13 is a flow diagram of a process by which the overcharge protection system illustrated in FIGS. 12A and 12B interrupts current flow between the terminal pads of the cell in response to an overcharge event, in accordance with embodiments of the present technique.

FIG. 13 illustrates an example of a process 190 whereby the CDD 140 illustrated in FIGS. 12 and 14 respond to an overcharge event within the cell 60. For this example, the cover 84 and remainder of packaging 62 of the cell 60 may be conductive (e.g., metallic) and neutral, or may be non-conductive (e.g., polymeric, plastic). Like the processes 150 and 170 discussed above, the process 190 illustrated in FIG. 13 begins with the pressure in the cell 60 increasing in response to the overcharge event (block 152). When the pressure in the cell 60 reaches a pressure threshold, based on the dimensions of the reversal disk 104, the reversal disk 104 deflects upwards, as indicated by the arrows 192 illustrated in FIGS. 12B and 14B, respectively (block 154). This deflection provides sufficient force to displace (e.g., move, translate, deflect) the conductive element (e.g., conductive member 180 or spiral disk feature 106) upwards (e.g., along the arrow 192 of FIGS. 12B and 14B) towards the terminal pads 112A and 112B (block 194). The physical contact between the conductive element (e.g., conductive member 180 or spiral disk feature 106) and both terminal pads 112A and 112B forms a short-circuit between the terminal pads, wherein a substantial portion (e.g., a majority, most) of the current passes through the conductive element (e.g., conductive member 180 or spiral disk feature 106), as indicated by the arrows 195 in FIGS. 12B and 14B, respectively (block 196). For the embodiment illustrated in FIG. 12B, since the reversal disk 104 is electrically insulated from the conductive member 180, the short-circuit current does not traverse or electrify the cover 84 or packaging 62 of the cell 60. For the embodiment illustrated in FIG. 14B, since the reversal disk 104 is in electrical contact with the spiral disk feature 106, and since the legs 202 of the spiral disk feature 106 are coupled to the cover 84, a small portion of the short-circuit current can traverse or electrify the cover 84 or packaging 62 of the cell 60. However, as mentioned above, at least the portion of the conductive element (e.g., conductive member 180 or the central portion 200 of the spiral disk feature 106) is substantially (e.g., 2×-10×) thicker and, therefore, less resistive than the reversal disk 104. As such, a substantial portion of the short-circuit current traverses the lower resistance conductive element (e.g., conductive member 180, the central portion 200 of the spiral disk feature 106), as opposed to the reversal disk 104, the cover 84, or the packaging 62. Similar to the processes 150 and 170 discussed above, as illustrated in FIG. 13, the power assembly 95 of the cell 60 resistively heats in response to the external short-circuit (block 162) until a portion of the power assembly 95 fails (block 164), and the cell 60 subsequently cools in response to the interruption in the internal electrical pathway and current between the terminal pads 112A and 112B as the overcharge event is mitigated/interrupted.

One or more of the disclosed embodiments, alone or on combination, may provide one or more technical effects including the manufacture of battery modules having a current diverge device (CDD) that externally short-circuits a prismatic lithium ion battery cell in response to an increase in pressure within the cell's interior. Certain embodiments of lithium ion battery cells of the present approach are able to respond more quickly (e.g., at a relatively low pressure, at a relatively lower state of charge (SOC) of the battery cell) to interrupt current in the battery cell in response to an overcharge condition, reducing the risk of damage to the battery module and/or the stationary energy storage system. Additionally, despite being able to interrupt current in a battery cell in response to a low activation pressure, the disclosed CDDs are designed and arranged to carry a sufficient amount of current during short-circuiting to ensure that the flow of current is permanently interrupted between the terminals of the battery cell in response to an overcharging event. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A prismatic lithium ion battery cell, comprising:
   a packaging that includes a can and a cover sealed to the can;
   a power assembly disposed within the packaging; and
   a first terminal pad and a second terminal pad respectively disposed above the cover and electrically coupled to the power assembly, the cover including:
   a first spiral disk disposed below the first terminal pad;
   a second spiral disk disposed below the second terminal pad;
   a first reversal disk disposed below the first spiral disk; and
   a second reversal disk disposed below the second spiral disk, the first and second reversal disks being configured to deflect to displace at least a portion of the first and second spiral disks to cause the first and second spiral disks to contact the first and second terminal pads, respectively, in response to a pressure within the packaging being greater than a predefined pressure threshold, the first and second spiral disks forming an external short-circuit between the first and second terminal pads when the first and second spiral disks are in contact with the first and second terminal pads, respectively, a portion of the power assembly failing in response to the external short-circuit and interrupting a current flow between the first and second terminal pads.

2. The battery cell of claim 1, wherein the first and second spiral disk features are integrated into the cover and formed in relief.

3. The battery cell of claim 1, wherein the cover comprises a vent disk configured to activate to release effluent from an interior of the packaging at a second predefined pressure threshold, and wherein the first pressure threshold is less than the second pressure threshold.

4. The battery cell of claim 3, wherein the second predefined pressure threshold is at least 50% greater than the first predefined pressure threshold.

5. The battery cell of claim 1, wherein a portion of the current flow associated with the external short-circuit traverses the first terminal pad, the first spiral disk feature, the cover, the second spiral disk feature, and the second terminal pad.

6. The battery cell of claim 1, comprising a terminal insulator disposed between the cover and the first and second terminal pads that electrically isolates the cover from the first and second terminal pads, wherein the terminal insulator defines an opening that allows the first spiral disk feature to be displaced through the opening to contact the first terminal pad.

7. The battery cell of claim 1, wherein the power assembly comprises:
   a coil stack with at least one coil;
   a first current collector coupled to a first electrode of the at least one coil;
   a second current collector coupled to a second electrode of the at least a first terminal post that extends through the cover and is coupled to the at least one coil;
   a first terminal post that extends through the cover and is coupled to the first current collector and the first terminal pad; and
   a second terminal post that extends through the cover and is coupled to a second current collector and the second terminal pad.

8. The battery cell of claim 7, wherein the at least one coil comprises a coil stack having two or more coils.

9. The battery cell of claim 7, wherein the first or second current collector is the portion of the power assembly that fails in response to the external short-circuit to interrupt current flow between the first and second terminal pads.

10. The battery cell of claim 9, wherein the first or second current collector that fails includes a fuse that is designed to melt and fail before other portions of the power assembly to interrupt current flow between the first and second terminal pads in response to the external short-circuit.

11. The battery cell of claim 1, wherein the first and second terminal pads and the first and second terminal posts are electrically isolated from the cover before the external short-circuit is formed in response to the pressure within the packaging.

12. The battery cell of claim 1, wherein the cell has a capacity of approximately 100 amp hours (Ah) or more.

13. The battery cell of claim 1, wherein the cell is part of a lithium ion battery module.

14. The battery cell of claim 13, wherein the lithium ion battery module is part of a stationary energy storage system.

* * * * *